US012008573B2

(12) United States Patent
Tate et al.

(10) Patent No.: US 12,008,573 B2
(45) Date of Patent: Jun. 11, 2024

(54) COMPUTER-IMPLEMENTED SYSTEMS AND METHODS FOR DETECTING FRAUDULENT ACTIVITY

(71) Applicant: SHOPIFY INC., Ottawa (CA)

(72) Inventors: Kyle Bruce Tate, Ottawa (CA); Ronie Miguel Uliana, Ottawa (CA)

(73) Assignee: SHOPIFY INC., Ottawa (CA)

( * ) Notice: Subject to any disclaimer, the term of this patent is extended or adjusted under 35 U.S.C. 154(b) by 611 days.

(21) Appl. No.: 17/154,208

(22) Filed: Jan. 21, 2021

(65) Prior Publication Data
US 2022/0230178 A1    Jul. 21, 2022

(51) Int. Cl.
*G06F 16/901*    (2019.01)
*G06Q 20/12*     (2012.01)
*G06Q 20/40*     (2012.01)

(52) U.S. Cl.
CPC ..... *G06Q 20/4016* (2013.01); *G06F 16/9024* (2019.01); *G06Q 20/12* (2013.01)

(58) Field of Classification Search
CPC ............ G06Q 20/4016; G06F 16/9024
See application file for complete search history.

(56) References Cited

U.S. PATENT DOCUMENTS

2016/0328715 A1\* 11/2016 Gideoni ............... G06Q 20/401
2019/0378050 A1\* 12/2019 Edkin .................... G06N 20/20
2021/0264299 A1\*  8/2021 Tomoda ............. G06Q 20/4016

FOREIGN PATENT DOCUMENTS

CN       112016927 A   * 12/2020

OTHER PUBLICATIONS

B. Zhang, Y. Zhou and C. Faloutsos, "Toward a Comprehensive Model in Internet Auction Fraud Detection," Proceedings of the 41st Annual Hawaii International Conference on System Sciences (HICSS 2008), Waikoloa, HI, USA, 2008, pp. 79-79, doi: 10.1109/HICSS.2008.455. (Year: 2008).*
Ban, Yi-kun, Duan, Yi-tao, and Huang, Ling, "Method for Detecting Abnormal Data, Device and Computer Readable StorageMedium," 2020, English Translation of CN 112016927 A (Year: 2020).*

(Continued)

*Primary Examiner* — Jacob C. Coppola
*Assistant Examiner* — Scott Michael Diroma

(57) ABSTRACT

An e-commerce platform may be subject to fraudulent activity. In some embodiments, a graph is used to represent the connection between users of the e-commerce platform. The graph may be built and maintained using a belief propagation algorithm. The graph may be used to assign, to each user, the probability that the user is fraudulent. In some embodiments, the use of the graph and updating the graph are two independent operations: one performed in real-time, and the other performed offline. In some embodiments, additional information may be requested from a user if the user is assigned a high probability of being fraudulent, in order to try to better determine whether or not the user is a fraudulent user. The embodiments are not limited to an e-commerce platform, but may generally apply to any computer system in which there is a desire to detect fraudulent activity.

23 Claims, 10 Drawing Sheets

(56) References Cited

OTHER PUBLICATIONS

"Belief propagation", Wikipedia. Published Dec. 11, 2020. Enclosed printed copy is from Jan. 25, 2021, and is 8 pages. Can be accessed at: https://en.wikipedia.org/wiki/Belief_propagation.

Huang, Bert. "Belief propagation", 15 pages of screenshots enclosed. Video uploaded on Nov. 10, 2015. [Retrieved on Jan. 25, 2021]. Video retrieved online via URL: https://www.youtube.com/watch?v=meBWAboEWQk.

* cited by examiner

E-Commerce Platform | Search | JG John's Apparel / Jonny B. Good

- Home
- Orders
- Products
- Customers
- Reports
- Discounts
- Apps

SALES CHANNELS ⊕
- Online Store
- Mobile App

View all channels

⚙ Settings

---

All channels ⌄   Today ⌄

TOTAL SALES
$98.00

$125
$75
$25

12am   8pm   4pm   11pm
          Jun 1      2 orders

TOTAL SALES BY CHANNEL   View dashboard

Online Store                 Jun 1
$0.00                        0 orders

Mobile app
$0.00                        0 orders

Shopify POS (126 York St.)
$0.00                        0 orders

---

Good afternoon, Jonny B..

Here's what's happening with your store today.

Today's total sales    Today's visits
$98.00                 1

● Update your Platform Payments tax details
We require additional information to verify your identity.
[Update tax details]

● Advanced Cash on Delivery has been deactivated for your store
[See why]

FIG. 2

COMPUTER-IMPLEMENTED SYSTEMS AND METHODS FOR DETECTING FRAUDULENT ACTIVITY

FIELD

The present application relates to fraud detection, and in some embodiments estimating the likelihood of a fraudulent user before an e-commerce transaction takes place.

BACKGROUND

An e-commerce platform may sometimes be subject to fraudulent activity by a user. A user associated with fraudulent activity will be referred to as a fraudulent user. A fraudulent user might be, for example, a visitor to an online store (e.g. a customer), a merchant, or a partner interacting with the e-commerce platform.

A simple example of fraudulent activity is a fraudulent user obtaining a stolen credit card number and using the credit card number to purchase items on one or more online stores of the e-commerce platform. A more sophisticated example of fraudulent activity is a fraudulent user signing up to the e-commerce platform as a new merchant, building an online store, creating fake inventory, purchasing the fake inventory on the e-commerce platform using a stolen credit card number, and receiving a merchant payout from the e-commerce platform for the purchased fake inventory.

One way to detect fraudulent activity is to search for signals that might be indicative of fraudulent activity, e.g. a surge of orders from the same IP address. However, distinguishing fraudulent activity from non-fraudulent activity based on such signals can sometimes be difficult. Also, by the time fraudulent activity is detected based on such signals, it might be too late, e.g. the fraud has successfully occurred.

SUMMARY

In some embodiments, users of an e-commerce platform may be linked to each other via common attributes. An attribute is information associated with a user, e.g. an email address of the user, an IP address used by the user, the user's contact address, etc. When two users share an attribute, the users may be connected through that attribute, e.g. in the form of a graph. In some embodiments, an untrustworthiness value indicative of fraudulent activity (e.g. a probability that a user is a fraudulent user) may be assigned to each user and/or each attribute. The value may be based on the untrustworthiness of the user/attribute itself, or how connected the user/attribute is to another untrustworthy user/attribute.

For example, a graph representing the connection between users of the e-commerce platform may be built and maintained using a belief propagation algorithm. The graph may be used to determine and assign, to each user, the probability that the user is a fraudulent user. However, in some embodiments, updating such a graph to reflect the impact of new users might be computationally complex.

In some embodiments, the use of the graph and updating the graph are two independent operations: one performed in real-time (or near real-time), and the other performed offline. For example, as soon as a new user begins to interact with the e-commerce platform (e.g. makes web resource requests) and begins providing attributes, the probability that the user is a fraudulent user may first be computed in real-time or near real-time using values in the existing graph, e.g. using the untrustworthiness value of an attribute shared with another user. If the new user is suspicious (e.g. probability above a certain threshold), then the new user may be required to provide one or more attributes to refine the probability that the user is fraudulent. In this way, in some embodiments it may be determined whether the user is fraudulent before the fraudulent activity successfully occurs, all in real-time or near real-time as the new user interacts with the e-commerce platform. In some embodiments, later (e.g. offline), the system may then perform a graph update (e.g. belief propagation) in order to incorporate, into the graph, the impact of the new user and the new user's associated attributes.

Embodiments are not limited to an e-commerce platform, but may be implemented in any computer system in which fraud is a concern, e.g. a social media platform.

In one embodiment, a computer-implemented method may be provided. The method may begin with a step in which information provided to a computer system is received. The received information originates from a user device. The received information may include a first attribute. The method may further include determining that the first attribute matches a second attribute. The second attribute may be known to the computer system prior to receiving the information from the user device. The second attribute may have an associated attribute untrustworthiness value that is indicative of a first level of untrustworthiness. Afterwards, a step may be performed involving assigning a user untrustworthiness value to a user associated with the user device. The user untrustworthiness value may be indicative of a second level of untrustworthiness and may be based at least on the attribute untrustworthiness value associated with the second attribute. The method may further include providing web content to the user device. The web content may be based, at least in part, on the user untrustworthiness value.

In some embodiments in response to the user untrustworthiness value falling within a particular range, the web content may include a request prompting the user to provide additional information. In some embodiments, the method may further include receiving an additional attribute in response to the prompting the user for the additional information. In some embodiments, the method may further include redetermining the user untrustworthiness value based at least on the attribute untrustworthiness value associated with the second attribute and another attribute untrustworthiness value that is associated with the additional attribute.

In some embodiments, in response to the user untrustworthiness value falling outside the particular range, the web content may be the web content requested by the user.

In some embodiments, subsequent to transmitting the web content to the user device, the method may further include: in response to an occurrence of a predefined event, updating at least attribute untrustworthiness values associated with one or more attributes that were known to the computer system prior to receiving the information from the user device. In some embodiments, the updating may be based on at least the user untrustworthiness value assigned to the user associated with the user device. In some embodiments, the predefined event may be at least one of: a particular amount of time since a previous update of the attribute untrustworthiness values, a particular number of new users providing information to the computer system, a particular number of shared attributes between new users and attributes previously known to the computer system, or a new user being assigned a user untrustworthiness value that falls within a particular range. In some embodiments, assigning the user untrustworthiness value may be performed while the user device is interacting with the computer system. In some embodiments, the updating at least the attribute untrustworthiness values in response to the occurrence of the predefined event may be performed after the user device has interacted with the computer system.

In some embodiments, the first attribute may be an item of information provided before completing a transaction. In some embodiments, the item of information may be for use by the computer system to communicate with the user.

In some embodiments, the first attribute may be one of the following associated with the user: a user name, an e-mail address, a phone number, an IP address, a postal address, a domain, financial information, an indication of a product previously purchased by the user, an indication of an online store the user previously purchased from, or browser details.

In some embodiments, a graph may be stored in memory, the graph including: user nodes, where each user node corresponds to a respective different user with a respective user untrustworthiness value; and/or attribute nodes, where each attribute node corresponds to a respective different attribute with a respective attribute untrustworthiness value. In some embodiments, each user node may be connected to each attribute node associated with an attribute of that user, and different users sharing a same attribute may both be connected to the attribute node associated with the same attribute. In some embodiments, each user untrustworthiness value and each attribute untrustworthiness value may be a probability value. In some embodiments, the method may further include updating each probability value associated with one or more of the attribute nodes and/or one or more of the user nodes. In some embodiments, the updating may be performed via belief propagation according to a belief propagation algorithm. In some embodiments, the updating may be based on at least the probability value assigned to the user node associated with the user device.

A system is also disclosed that is configured to perform the methods disclosed herein. For example, the system may include a network interface that is used to provide the generated web content to the user device after assigning the user untrustworthiness value to the user and at least one processor to directly perform (or instruct the system to perform) the method steps. For example, a system may include at least one processor to: receive information provided to a computer system by a user device, the information including a first attribute; determine that the first attribute matches a second attribute, the second attribute known to the computer system prior to receiving the information from the user device, and the second attribute having an associated attribute untrustworthiness value that is indicative of a first level of untrustworthiness; assign, to a user associated with the user device, a user untrustworthiness value that is indicative of a second level of untrustworthiness, the user untrustworthiness value based at least on the attribute untrustworthiness value associated with the second attribute; and generate web content based, at least in part, on the user untrustworthiness value. The system may further include a network interface to transmit the web content to the user device.

In another embodiment, there is provided a computer readable medium having stored thereon computer-executable instructions that, when executed by a computer, cause the computer to perform operations of the methods described above.

BRIEF DESCRIPTION OF THE DRAWINGS

Embodiments will be described, by way of example only, with reference to the accompanying figures wherein:

FIG. 2 is an example of a home page of an administrator, according to one embodiment;

DETAILED DESCRIPTION

For illustrative purposes, specific example embodiments will now be explained in greater detail below in conjunction with the figures.

Example E-Commerce Platform

In some embodiments, the methods disclosed herein may be performed in relation to a commerce platform, which will be referred to herein as an e-commerce platform. Therefore, for completeness, an example of an e-commerce platform will first be described.

Figure 1:
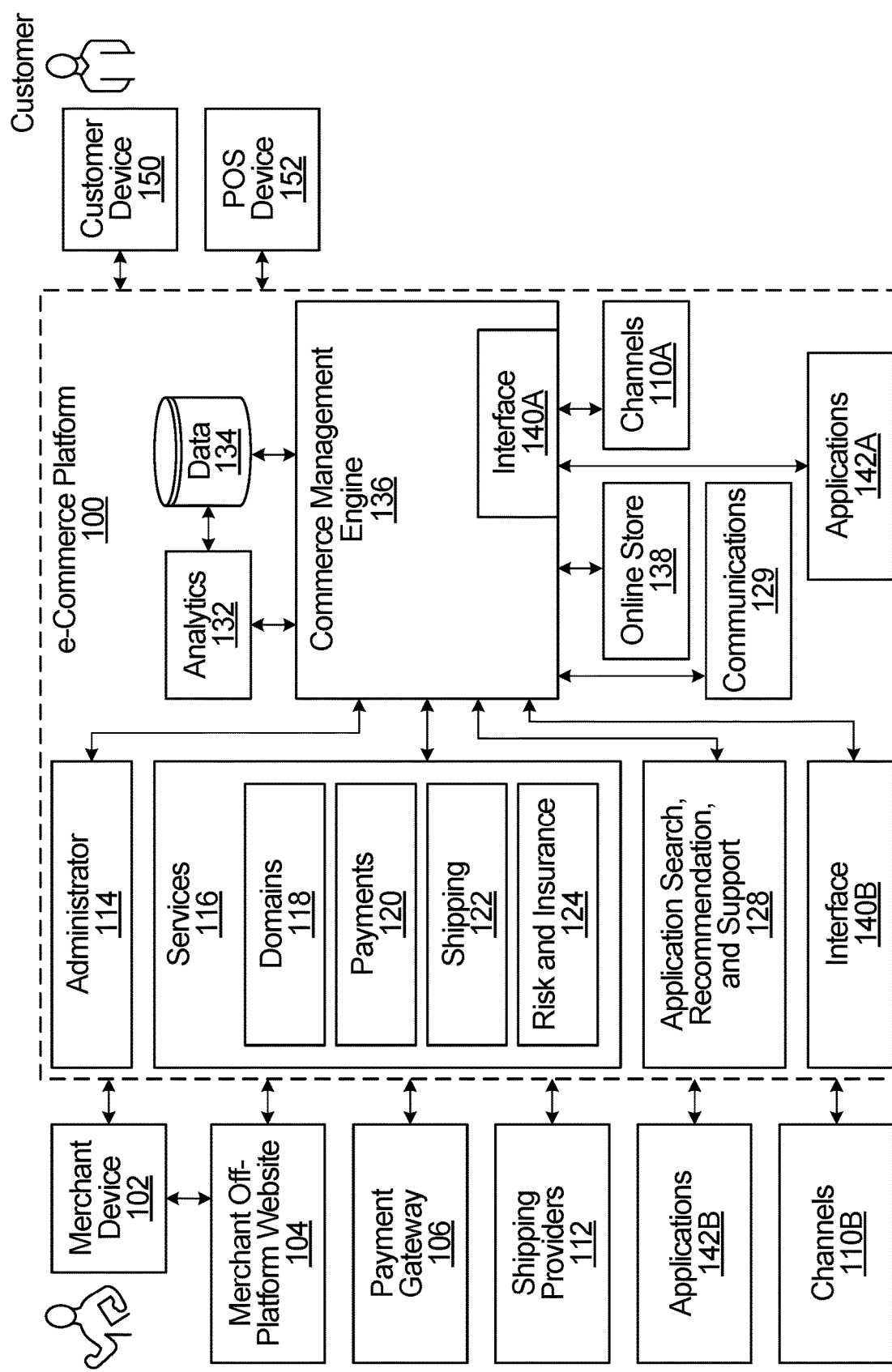
FIG. 1 is a block diagram of an e-commerce platform, according to one embodiment.

FIG. 1 illustrates an e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including physical products, digital content, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products; an enterprise user; a customer relations or customer management agent, and the like), an information technology user, a computing entity user (e.g., a computing bot for purchase, sales, or use of products), and the like.

The e-commerce platform 100 may provide a centralized system for providing merchants with online resources and facilities for managing their business. The facilities described herein may be deployed in part or in whole through a machine that executes computer software, modules, program codes, and/or instructions on one or more processors which may be part of or external to the platform 100. Merchants may utilize the e-commerce platform 100 for managing commerce with customers, such as by implementing an e-commerce experience with customers through an online store 138, through channels 110A-B, through POS devices 152 in physical locations (e.g., a physical storefront or other location such as through a kiosk, terminal, reader, printer, 3D printer, and the like), by managing their business through the e-commerce platform 100, and by interacting with customers through a communications facility 129 of the e-commerce platform 100, or any combination thereof. A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform), and the like. However, even these 'other' merchant commerce facilities may be incorporated into the e-commerce platform, such as where POS devices 152 in a physical store of a merchant are linked into the e-commerce platform 100, where a merchant off-platform website 104 is tied into the e-commerce platform 100, such as through 'buy buttons' that link content from the merchant off platform website 104 to the online store 138, and the like.

The online store 138 may represent a multitenant facility comprising a plurality of virtual storefronts. In embodiments, merchants may manage one or more storefronts in the online store 138, such as through a merchant device 102 (e.g., computer, laptop computer, mobile computing device, and the like), and offer products to customers through a number of different channels 110A-B (e.g., an online store 138; a physical storefront through a POS device 152; electronic marketplace, through an electronic buy button integrated into a website or social media channel such as on a social network, social media page, social media messaging system; and the like). A merchant may sell across channels 110A-B and then manage their sales through the e-commerce platform 100, where channels 110A may be provided internal to the e-commerce platform 100 or from outside the e-commerce channel 110B. A merchant may sell in their physical retail store, at pop ups, through wholesale, over the phone, and the like, and then manage their sales through the e-commerce platform 100. A merchant may employ all or any combination of these, such as maintaining a business through a physical storefront utilizing POS devices 152, maintaining a virtual storefront through the online store 138, and utilizing a communication facility 129 to leverage customer interactions and analytics 132 to improve the probability of sales. Throughout this disclosure the terms online store 138 and storefront may be used synonymously to refer to a merchant's online e-commerce offering presence through the e-commerce platform 100, where an online store 138 may refer to the multitenant collection of storefronts supported by the e-commerce platform 100 (e.g., for a plurality of merchants) or to an individual merchant's storefront (e.g., a merchant's online store).

In some embodiments, a customer may interact through a customer device 150 (e.g., computer, laptop computer, mobile computing device, and the like), a POS device 152 (e.g., retail device, a kiosk, an automated checkout system, and the like), or any other commerce interface device known in the art. The e-commerce platform 100 may enable merchants to reach customers through the online store 138, through POS devices 152 in physical locations (e.g., a merchant's storefront or elsewhere), to promote commerce with customers through dialog via electronic communication facility 129, and the like, providing a system for reaching customers and facilitating merchant services for the real or virtual pathways available for reaching and interacting with customers.

In some embodiments, and as described further herein, the e-commerce platform 100 may be implemented through a processing facility including a processor and a memory, the processing facility storing a set of instructions that, when executed, cause the e-commerce platform 100 to perform the e-commerce and support functions as described herein. The processing facility may be part of a server, client, network infrastructure, mobile computing platform, cloud computing platform, stationary computing platform, or other computing platform, and provide electronic connectivity and communications between and amongst the electronic components of the e-commerce platform 100, merchant devices 102, payment gateways 106, application developers, channels 110A-B, shipping providers 112, customer devices 150, point of sale devices 152, and the like. The e-commerce platform 100 may be implemented as a cloud computing service, a software as a service (SaaS), infrastructure as a service (IaaS), platform as a service (PaaS), desktop as a Service (DaaS), managed software as a service (MSaaS), mobile backend as a service (MBaaS), information technology management as a service (ITMaaS), and the like, such as in a software and delivery model in which software is licensed on a subscription basis and centrally hosted (e.g., accessed by users using a client (for example, a thin client) via a web browser or other application, accessed through by POS devices, and the like). In some embodiments, elements of the e-commerce platform 100 may be implemented to operate on various platforms and operating systems, such as iOS, Android, on the web, and the like (e.g., the administrator 114 being implemented in multiple instances for a given online store for iOS, Android, and for the web, each with similar functionality).

In some embodiments, the online store 138 may be served to a customer device 150 through a webpage provided by a server of the e-commerce platform 100. The server may receive a request for the webpage from a browser or other application installed on the customer device 150, where the browser (or other application) connects to the server through an IP Address, the IP address obtained by translating a domain name. In return, the server sends back the requested webpage. Webpages may be written in or include Hypertext Markup Language (HTML), template language, JavaScript, and the like, or any combination thereof. For instance, HTML is a computer language that describes static information for the webpage, such as the layout, format, and content of the webpage. Website designers and developers may use the template language to build webpages that combine static content, which is the same on multiple pages, and dynamic content, which changes from one page to the next. A template language may make it possible to re-use the static elements that define the layout of a webpage, while dynamically populating the page with data from an online store. The static elements may be written in HTML, and the dynamic elements written in the template language. The template language elements in a file may act as placeholders, such that the code in the file is compiled and sent to the customer device 150 and then the template language is replaced by data from the online store 138, such as when a theme is installed. The template and themes may consider tags, objects, and filters. The client device web browser (or other application) then renders the page accordingly.

In some embodiments, online stores 138 may be served by the e-commerce platform 100 to customers, where customers can browse and purchase the various products available (e.g., add them to a cart, purchase immediately through a buy-button, and the like). Online stores 138 may be served to customers in a transparent fashion without customers necessarily being aware that it is being provided through the e-commerce platform 100 (rather than directly from the merchant). Merchants may use a merchant configurable domain name, a customizable HTML theme, and the like, to customize their online store 138. Merchants may customize the look and feel of their website through a theme system, such as where merchants can select and change the look and feel of their online store 138 by changing their theme while having the same underlying product and business data shown within the online store's product hierarchy. Themes may be further customized through a theme editor, a design interface that enables users to customize their website's design with flexibility. Themes may also be customized using theme-specific settings that change aspects, such as specific colors, fonts, and pre-built layout schemes. The online store may implement a content management system for website content. Merchants may author blog posts or static pages and publish them to their online store 138, such as through blogs, articles, and the like, as well as configure navigation menus. Merchants may upload images (e.g., for products), video, content, data, and the like to the e-commerce platform 100, such as for storage by the system (e.g. as data 134). In some embodiments, the e-commerce platform 100 may provide functions for resizing images, associating an image with a product, adding and associating text with an image, adding an image for a new product variant, protecting images, and the like.

As described herein, the e-commerce platform 100 may provide merchants with transactional facilities for products through a number of different channels 110A-B, including the online store 138, over the telephone, as well as through physical POS devices 152 as described herein. The e-commerce platform 100 may include business support services 116, an administrator 114, and the like associated with running an on-line business, such as providing a domain service 118 associated with their online store, payment services 120 for facilitating transactions with a customer, shipping services 122 for providing customer shipping options for purchased products, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may provide for integrated shipping services 122 (e.g., through an e-commerce platform shipping facility or through a third-party shipping carrier), such as providing merchants with real-time updates, tracking, automatic rate calculation, bulk order preparation, label printing, and the like.

FIG. 2 depicts a non-limiting embodiment for a home page of an administrator 114, which may show information about daily tasks, a store's recent activity, and the next steps a merchant can take to build their business. In some embodiments, a merchant may log in to administrator 114 via a merchant device 102 such as from a desktop computer or mobile device, and manage aspects of their online store 138, such as viewing the online store's 138 recent activity, updating the online store's 138 catalog, managing orders, recent visits activity, total orders activity, and the like. In some embodiments, the merchant may be able to access the different sections of administrator 114 by using the sidebar, such as shown on FIG. 2. Sections of the administrator 114 may include various interfaces for accessing and managing core aspects of a merchant's business, including orders, products, customers, available reports and discounts. The administrator 114 may also include interfaces for managing sales channels for a store including the online store, mobile application(s) made available to customers for accessing the store (Mobile App), POS devices, and/or a buy button. The administrator 114 may also include interfaces for managing applications (Apps) installed on the merchant's account; settings applied to a merchant's online store 138 and account. A merchant may use a search bar to find products, pages, or other information. Depending on the device 102 or software application the merchant is using, they may be enabled for different functionality through the administrator 114. For instance, if a merchant logs in to the administrator 114 from a browser, they may be able to manage all aspects of their online store 138. If the merchant logs in from their mobile device (e.g. via a mobile application), they may be able to view all or a subset of the aspects of their online store 138, such as viewing the online store's 138 recent activity, updating the online store's 138 catalog, managing orders, and the like.

More detailed information about commerce and visitors to a merchant's online store 138 may be viewed through acquisition reports or metrics, such as displaying a sales summary for the merchant's overall business, specific sales and engagement data for active sales channels, and the like. Reports may include, acquisition reports, behavior reports, customer reports, finance reports, marketing reports, sales reports, custom reports, and the like. The merchant may be able to view sales data for different channels 110A-B from different periods of time (e.g., days, weeks, months, and the like), such as by using drop-down menus. An overview dashboard may be provided for a merchant that wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, and the like. Notifications may be provided to assist a merchant with navigating through a process, such as capturing a payment, marking an order as fulfilled, archiving an order that is complete, and the like.

The e-commerce platform 100 may provide for a communications facility 129 and associated merchant interface for providing electronic communications and marketing, such as utilizing an electronic messaging aggregation facility for collecting and analyzing communication interactions between merchants, customers, merchant devices 102, customer devices 150, POS devices 152, and the like, to aggregate and analyze the communications, such as for increasing the potential for providing a sale of a product, and the like. For instance, a customer may have a question related to a product, which may produce a dialog between the customer and the merchant (or automated processor-based agent representing the merchant), where the communications facility 129 analyzes the interaction and provides analysis to the merchant on how to improve the probability for a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between an e-commerce platform 100 financial institution account and a merchant's bank account (e.g., when using capital), and the like. These systems may have Sarbanes-Oxley Act (SOX) compliance and a high level of diligence required in their development and operation. The financial facility 120 may also provide merchants with financial support, such as through the lending of capital (e.g., lending funds, cash advances, and the like) and provision of insurance. In addition, the e-commerce platform 100 may provide for a set of marketing and partner services and control the relationship between the e-commerce platform 100 and partners. They also may connect and onboard new merchants with the e-commerce platform 100. These services may enable merchant growth by making it easier for merchants to work across the e-commerce platform 100. Through these services, merchants may be provided help facilities via the e-commerce platform 100.

In some embodiments, online store 138 may support a great number of independently administered storefronts and process a large volume of transactional data on a daily basis for a variety of products. Transactional data may include customer contact information, billing information, shipping information, information on products purchased, information on services rendered, and any other information associated with business through the e-commerce platform 100. In some embodiments, the e-commerce platform 100 may store this data in a data facility 134. The transactional data may be processed to produce analytics 132, which in turn may be provided to merchants or third-party commerce entities, such as providing consumer trends, marketing and sales insights, recommendations for improving sales, evaluation of customer behaviors, marketing and sales modeling, trends in fraud, and the like, related to online commerce, and provided through dashboard interfaces, through reports, and the like. The e-commerce platform 100 may store information about business and merchant transactions, and the data facility 134 may have many ways of enhancing, contributing, refining, and extracting data, where over time the collected data may enable improvements to aspects of the e-commerce platform 100.

Referring again to FIG. 1, in some embodiments the e-commerce platform 100 may be configured with a commerce management engine 136 for content management, task automation and data management to enable support and services to the plurality of online stores 138 (e.g., related to products, inventory, customers, orders, collaboration, suppliers, reports, financials, risk and fraud, and the like), but be extensible through applications 142A-B that enable greater flexibility and custom processes required for accommodating an ever-growing variety of merchant online stores, POS devices, products, and services, where applications 142A may be provided internal to the e-commerce platform 100 or applications 142B from outside the e-commerce platform 100. In some embodiments, an application 142A may be provided by the same party providing the platform 100 or by a different party. In some embodiments, an application 142B may be provided by the same party providing the platform 100 or by a different party. The commerce management engine 136 may be configured for flexibility and scalability through portioning (e.g., sharding) of functions and data, such as by customer identifier, order identifier, online store identifier, and the like. The commerce management engine 136 may accommodate store-specific business logic and in some embodiments, may incorporate the administrator 114 and/or the online store 138.

The commerce management engine 136 includes base or "core" functions of the e-commerce platform 100, and as such, as described herein, not all functions supporting online stores 138 may be appropriate for inclusion. For instance, functions for inclusion into the commerce management engine 136 may need to exceed a core functionality threshold through which it may be determined that the function is core to a commerce experience (e.g., common to a majority of online store activity, such as across channels, administrator interfaces, merchant locations, industries, product types, and the like), is re-usable across online stores 138 (e.g., functions that can be re-used/modified across core functions), limited to the context of a single online store 138 at a time (e.g., implementing an online store 'isolation principle', where code should not be able to interact with multiple online stores 138 at a time, ensuring that online stores 138 cannot access each other's data), provide a transactional workload, and the like. Maintaining control of what functions are implemented may enable the commerce management engine 136 to remain responsive, as many required features are either served directly by the commerce management engine 136 or enabled through an interface 140A-B, such as by its extension through an application programming interface (API) connection to applications 142A-B and channels 110A-B, where interfaces 140A may be provided to applications 142A and/or channels 110A inside the e-commerce platform 100 or through interfaces 140B provided to applications 142B and/or channels 110B outside the e-commerce platform 100. Generally, the platform 100 may include interfaces 140A-B (which may be extensions, connectors, APIs, and the like) which facilitate connections to and communications with other platforms, systems, software, data sources, code and the like. Such interfaces 140A-B may be an interface 140A of the commerce management engine 136 or an interface 140B of the platform 100 more generally. If care is not given to restricting functionality in the commerce management engine 136, responsiveness could be compromised, such as through infrastructure degradation through slow databases or non-critical backend failures, through catastrophic infrastructure failure such as with a data center going offline, through new code being deployed that takes longer to execute than expected, and the like. To prevent or mitigate these situations, the commerce management engine 136 may be configured to maintain responsiveness, such as through configuration that utilizes timeouts, queues, back-pressure to prevent degradation, and the like.

Although isolating online store data is important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, rather than violating the isolation principle, it may be preferred to move these components out of the commerce management engine 136 and into their own infrastructure within the e-commerce platform 100.

In some embodiments, the e-commerce platform 100 may provide for a platform payment facility 120, which is another example of a component that utilizes data from the commerce management engine 136 but may be located outside so as to not violate the isolation principle. The platform payment facility 120 may allow customers interacting with online stores 138 to have their payment information stored safely by the commerce management engine 136 such that they only have to enter it once. When a customer visits a different online store 138, even if they've never been there before, the platform payment facility 120 may recall their information to enable a more rapid and correct check out. This may provide a cross-platform network effect, where the e-commerce platform 100 becomes more useful to its merchants as more merchants join, such as because there are more customers who checkout more often because of the ease of use with respect to customer purchases. To maximize the effect of this network, payment information for a given customer may be retrievable from an online store's checkout, allowing information to be made available globally across online stores 138. It would be difficult and error prone for each online store 138 to be able to connect to any other online store 138 to retrieve the payment information stored there. As a result, the platform payment facility may be implemented external to the commerce management engine 136.

For those functions that are not included within the commerce management engine 136, applications 142A-B provide a way to add features to the e-commerce platform 100. Applications 142A-B may be able to access and modify data on a merchant's online store 138, perform tasks through the administrator 114, create new flows for a merchant through a user interface (e.g., that is surfaced through extensions/API), and the like. Merchants may be enabled to discover and install applications 142A-B through application search, recommendations, and support 128. In some embodiments, core products, core extension points, applications, and the administrator 114 may be developed to work together. For instance, application extension points may be built inside the administrator 114 so that core features may be extended by way of applications, which may deliver functionality to a merchant through the extension.

In some embodiments, applications 142A-B may deliver functionality to a merchant through the interface 140A-B, such as where an application 142A-B is able to surface transaction data to a merchant (e.g., App: "Engine, surface my app data in mobile and web admin using the embedded app SDK"), and/or where the commerce management engine 136 is able to ask the application to perform work on demand (Engine: "App, give me a local tax calculation for this checkout").

Applications 142A-B may support online stores 138 and channels 110A-B, provide for merchant support, integrate with other services, and the like. Where the commerce management engine 136 may provide the foundation of services to the online store 138, the applications 142A-B may provide a way for merchants to satisfy specific and sometimes unique needs. Different merchants will have different needs, and so may benefit from different applications 142A-B. Applications 142A-B may be better discovered through the e-commerce platform 100 through development of an application taxonomy (categories) that enable applications to be tagged according to a type of function it performs for a merchant; through application data services that support searching, ranking, and recommendation models; through application discovery interfaces such as an application store, home information cards, an application settings page; and the like.

Applications 142A-B may be connected to the commerce management engine 136 through an interface 140A-B, such as utilizing APIs to expose the functionality and data available through and within the commerce management engine 136 to the functionality of applications (e.g., through REST, GraphQL, and the like). For instance, the e-commerce platform 100 may provide API interfaces 140A-B to merchant and partners-facing products and services, such as including application extensions, process flow services, developer-facing resources, and the like. With customers more frequently using mobile devices for shopping, applications 142A-B related to mobile use may benefit from more extensive use of APIs to support the related growing commerce traffic. The flexibility offered through use of applications and APIs (e.g., as offered for application development) enable the e-commerce platform 100 to better accommodate new and unique needs of merchants (and internal developers through internal APIs) without requiring constant change to the commerce management engine 136, thus providing merchants what they need when they need it. For instance, shipping services 122 may be integrated with the commerce management engine 136 through a shipping or carrier service API, thus enabling the e-commerce platform 100 to provide shipping service functionality without directly impacting code running in the commerce management engine 136.

Many merchant problems may be solved by letting partners improve and extend merchant workflows through application development, such as problems associated with back-office operations (merchant-facing applications 142A-B) and in the online store 138 (customer-facing applications 142A-B). As a part of doing business, many merchants will use mobile and web related applications on a daily basis for back-office tasks (e.g., merchandising, inventory, discounts, fulfillment, and the like) and online store tasks (e.g., applications related to their online shop, for flash-sales, new product offerings, and the like), where applications 142A-B, through extension/API 140A-B, help make products easy to view and purchase in a fast growing marketplace. In some embodiments, partners, application developers, internal applications facilities, and the like, may be provided with a software development kit (SDK), such as through creating a frame within the administrator 114 that sandboxes an application interface. In some embodiments, the administrator 114 may not have control over nor be aware of what happens within the frame. The SDK may be used in conjunction with a user interface kit to produce interfaces that mimic the look and feel of the e-commerce platform 100, such as acting as an extension of the commerce management engine 136.

Applications 142A-B that utilize APIs may pull data on demand, but often they also need to have data pushed when updates occur. Update events may be implemented in a subscription model, such as for example, customer creation, product changes, or order cancelation. Update events may provide merchants with needed updates with respect to a changed state of the commerce management engine 136, such as for synchronizing a local database, notifying an external integration partner, and the like. Update events may enable this functionality without having to poll the commerce management engine 136 all the time to check for updates, such as through an update event subscription. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time.

In some embodiments, the e-commerce platform 100 may provide application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, a description of core application capabilities within the commerce management engine 136, and the like. These support facilities may be utilized by application development performed by any entity, including the merchant developing their own application 142A-B, a third-party developer developing an application 142A-B (e.g., contracted by a merchant, developed on their own to offer to the public, contracted for use in association with the e-commerce platform 100, and the like), or an application 142A or 142B being developed by internal personal resources associated with the e-commerce platform 100. In some embodiments, applications 142A-B may be assigned an application identifier (ID), such as for linking to an application (e.g., through an API), searching for an application, making application recommendations, and the like.

The commerce management engine 136 may include base functions of the e-commerce platform 100 and expose these functions through APIs 140A-B to applications 142A-B. The APIs 140A-B may enable different types of applications built through application development. Applications 142A-B may be capable of satisfying a great variety of needs for merchants but may be grouped roughly into three categories: customer-facing applications, merchant-facing applications, integration applications, and the like. Customer-facing applications 142A-B may include online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways.

In some embodiments, an application developer may use an application proxy to fetch data from an outside location and display it on the page of an online store 138. Content on these proxy pages may be dynamic, capable of being updated, and the like. Application proxies may be useful for displaying image galleries, statistics, custom forms, and other kinds of dynamic content. The core-application structure of the e-commerce platform 100 may allow for an increasing number of merchant experiences to be built in applications 142A-B so that the commerce management engine 136 can remain focused on the more commonly utilized business logic of commerce.

The e-commerce platform 100 provides an online shopping experience through a curated system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products on a channel 110A-B. A channel 110A-B is a place where customers can view and buy products. In some embodiments, channels 110A-B may be modeled as applications 142A-B (a possible exception being the online store 138, which is integrated within the commence management engine 136). A merchandising component may allow merchants to describe what they want to sell and where they sell it. The association between a product and a channel may be modeled as a product publication and accessed by channel applications, such as via a product listing API. A product may have many options, like size and color, and many variants that expand the available options into specific combinations of all the options, like the variant that is extra-small and green, or the variant that is size large and blue. Products may have at least one variant (e.g., a "default variant" is created for a product without any options). To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Products may be viewed as 2D images, 3D images, rotating view images, through a virtual or augmented reality interface, and the like.

In some embodiments, the customer may add what they intend to buy to their cart (in an alternate embodiment, a product may be purchased directly, such as through a buy button as described herein). Customers may add product variants to their shopping cart. The shopping cart model may be channel specific. The online store 138 cart may be composed of multiple cart line items, where each cart line item tracks the quantity for a product variant. Merchants may use cart scripts to offer special promotions to customers based on the content of their cart. Since adding a product to a cart does not imply any commitment from the customer or the merchant, and the expected lifespan of a cart may be in the order of minutes (not days), carts may be persisted to an ephemeral data store.

The customer then proceeds to checkout. A checkout component may implement a web checkout as a customer-facing order creation process. A checkout API may be provided as a computer-facing order creation process used by some channel applications to create orders on behalf of customers (e.g., for point of sale). Checkouts may be created from a cart and record a customer's information such as email address, billing, and shipping details. On checkout, the merchant commits to pricing. If the customer inputs their contact information but does not proceed to payment, the e-commerce platform 100 may provide an opportunity to re-engage the customer (e.g., in an abandoned checkout feature). For those reasons, checkouts can have much longer lifespans than carts (hours or even days) and are therefore persisted. Checkouts may calculate taxes and shipping costs based on the customer's shipping address. Checkout may delegate the calculation of taxes to a tax component and the calculation of shipping costs to a delivery component. A pricing component may enable merchants to create discount codes (e.g., 'secret' strings that when entered on the checkout apply new prices to the items in the checkout). Discounts may be used by merchants to attract customers and assess the performance of marketing campaigns. Discounts and other custom price systems may be implemented on top of the same platform piece, such as through price rules (e.g., a set of prerequisites that when met imply a set of entitlements). For instance, prerequisites may be items such as "the order subtotal is greater than $100" or "the shipping cost is under $10", and entitlements may be items such as "a 20% discount on the whole order" or "$10 off products X, Y, and Z".

Customers then pay for the content of their cart resulting in the creation of an order for the merchant. Channels 110A-B may use the commerce management engine 136 to move money, currency or a store of value (such as dollars or a cryptocurrency) to and from customers and merchants. Communication with the various payment providers (e.g., online payment systems, mobile payment systems, digital wallet, credit card gateways, and the like) may be implemented within a payment processing component. The actual interactions with the payment gateways 106 may be provided through a card server environment. In some embodiments, the payment gateway 106 may accept international payment, such as integrating with leading international credit card processors. The card server environment may include a card server application, card sink, hosted fields, and the like. This environment may act as the secure gatekeeper of the sensitive credit card information. In some embodiments, most of the process may be orchestrated by a payment processing job. The commerce management engine 136 may support many other payment methods, such as through an offsite payment gateway 106 (e.g., where the customer is redirected to another website), manually (e.g., cash), online payment methods (e.g., online payment systems, mobile payment systems, digital wallet, credit card gateways, and the like), gift cards, and the like. At the end of the checkout process, an order is created. An order is a contract of sale between the merchant and the customer where the merchant agrees to provide the goods and services listed on the orders (e.g., order line items, shipping line items, and the like) and the customer agrees to provide payment (including taxes). This process may be modeled in a sales component. Channels 110A-B that do not rely on commerce management engine 136 checkouts may use an order API to create orders. Once an order is created, an order confirmation notification may be sent to the customer and an order placed notification sent to the merchant via a notification component. Inventory may be reserved when a payment processing job starts to avoid over-selling (e.g., merchants may control this behavior from the inventory policy of each variant). Inventory reservation may have a short time span (minutes) and may need to be very fast and scalable to support flash sales (e.g., a discount or promotion offered for a short time, such as targeting impulse buying). The reservation is released if the payment fails. When the payment succeeds, and an order is created, the reservation is converted into a long-term inventory commitment allocated to a specific location. An inventory component may record where variants are stocked, and tracks quantities for variants that have inventory tracking enabled. It may decouple product variants (a customer facing concept representing the template of a product listing) from inventory items (a merchant facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) and mark the order as paid. The merchant may now prepare the products for delivery. In some embodiments, this business process may be implemented by a fulfillment component. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. A custom fulfillment service may send an email (e.g., a location that doesn't provide an API connection). An API fulfillment service may trigger a third party, where the third-party application creates a fulfillment record. A legacy fulfillment service may trigger a custom API call from the commerce management engine 136 to a third party (e.g., fulfillment by Amazon). A gift card fulfillment service may provision (e.g., generating a number) and activate a gift card. Merchants may use an order printer application to print packing slips. The fulfillment process may be executed when the items are packed in the box and ready for shipping, shipped, tracked, delivered, verified as received by the customer, and the like.

If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees, or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Use of the E-Commerce Platform 100 for Fraud Detection

A user may attempt to perform a transaction related to online store 138 of the e-commerce platform 100. The user might not have previously interacted with the e-commerce platform 100, and it might not be known whether the user is a fraudulent user. Information relating to the user may be analyzed to determine whether the user may be a fraudulent user. The information may be identifying information (e.g., contact information such as a name, e-mail address, shipping address, or phone number), and/or financial information (e.g., a method of payment, such as a credit card number), and/or browser information and/or an IP address, etc. Each item of information will be referred to as an attribute of the user. Previously determined values associated with the untrustworthiness of users and attributes known to the e-commerce platform 100 may be stored by a graph in memory. The graph will be referred to as a trust graph. Some of the attributes associated with a new user may match the attributes of users who have previously interacted with the e-commerce platform 100.

The e-commerce platform 100 may include a fraud detector that determines in real-time (or near real-time) whether a user is likely to commit fraudulent activity when performing an electronic transaction using the e-commerce platform 100. The fraud detector may determine whether a user may be fraudulent based on attributes associated with the user, and based on whether some or all of those attributes are shared by other users already known to the e-commerce platform 100. In some embodiments, the fraud detector is able to estimate the likelihood that a user may be fraudulent while the user is interacting with the e-commerce platform 100, prior to the user completing their desired transaction. If the fraud detector determines that the user is likely fraudulent, the fraud detector may apply "friction" to the user's transaction, which may include providing web content instructing the user to provide additional attributes to the e-commerce platform 100. The additional attributes may be used to determine, with more confidence, whether the user is trustworthy. In some embodiments, the trust graph mentioned above may be stored in memory in the e-commerce platform 100 and used to determine an untrustworthiness value of a user, and then update the untrustworthiness values of other users and attributes stored in the trust graph when a predefined event has occurred (e.g. when a particular amount of time has elapsed since a previous update of the untrustworthiness values).

Figure 3:
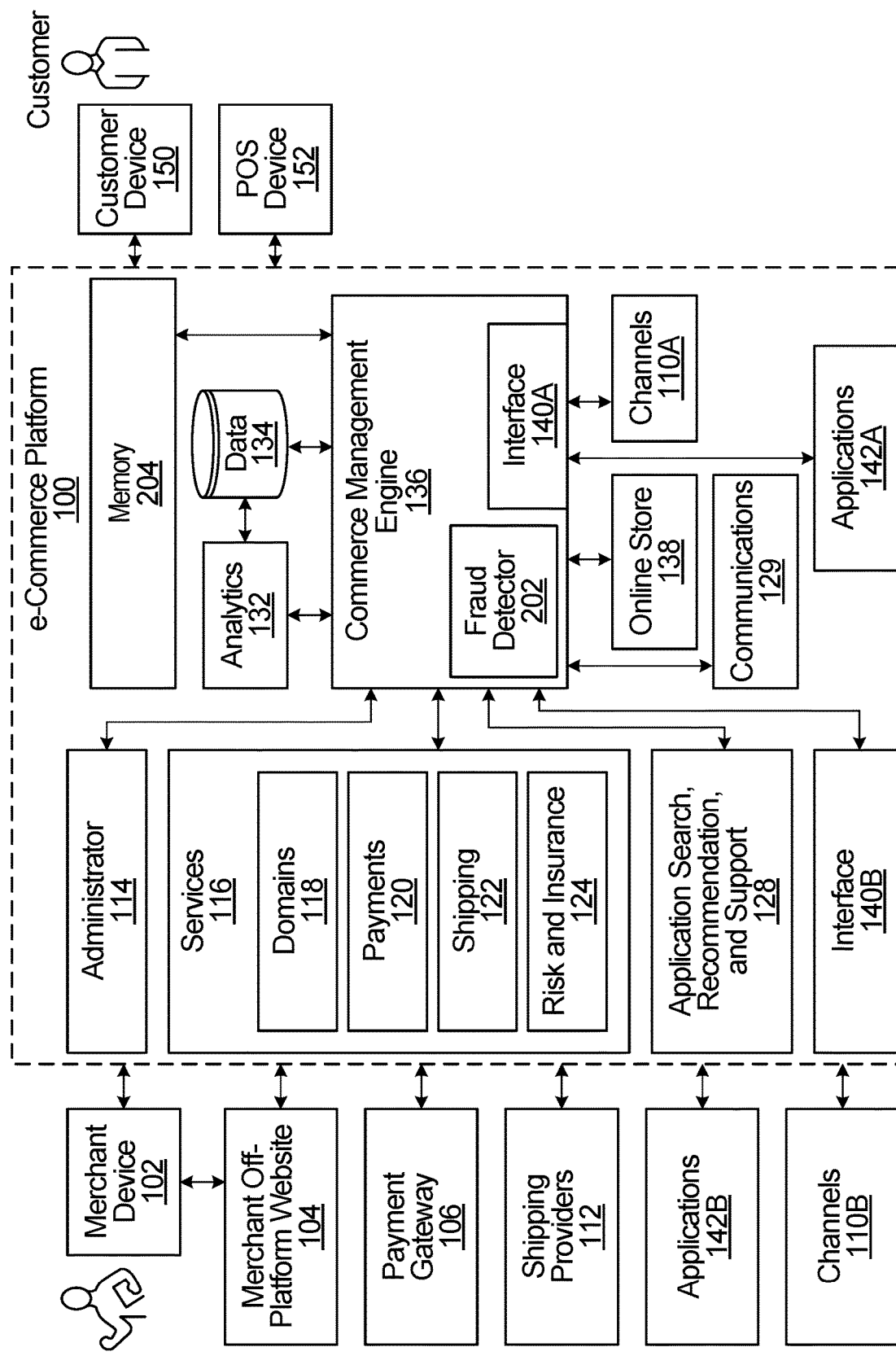
FIG. 3 illustrates the e-commerce platform of FIG. 1, but with a fraud detector.

FIG. 3 illustrates the e-commerce platform 100 of FIG. 1, but with a fraud detector 202 in the commerce management engine 136. The fraud detector 202 performs fraud detecting methods disclosed herein, e.g., determining the likelihood that a user interacting with an e-commerce platform 100 is engaging in fraudulent activity. For example, the fraud detector 202 may analyze attributes associated with a user interacting with online store 138, and determine whether any of these attributes are linked to fraudulent activity based on previous interactions of other users with the e-commerce platform 100, e.g. via a trust graph in the manner described herein. The fraud detector 202 may be used to determine whether a user is likely to commit fraudulent activity and prevent fraudulent activity from being performed before the user is able to complete a transaction, e.g., as described herein. The fraud detector 202 may be implemented by one or more general-purpose processors that execute instructions stored in a memory or stored in another non-transitory computer-readable medium. The instructions, when executed, cause the fraud detector 202 to perform the operations of the fraud detector 202. Alternatively, some or all of the fraud detector 202 may be implemented using dedicated circuitry, such as an application specific integrated circuit (ASIC), a graphics processing unit (GPU), or a programmed field programmable gate array (FPGA). In some embodiments, the fraud detector 202 may be located inside the e-commerce platform 100 but external to, and possibly coupled to, the commerce management engine 136. In some embodiments, the fraud detector 202 may instead be located externally to the e-commerce platform 100 and possibly coupled to the commerce management engine 136.

The e-commerce platform 100 of FIG. 3 also includes a memory 204. The memory 204 may contain data in the form of a trust graph that is used by the fraud detector 202 in the manner described herein. In some embodiments, the memory 204 may be part of the fraud detector 202.

Although the embodiments described herein may be implemented using the fraud detector 202 implemented in e-commerce platform 100, the embodiments are not limited to the specific e-commerce platform 100 of FIGS. 1 to 3 and could be used in connection with any e-commerce platform. Also, the embodiments described herein need not necessarily be implemented within the e-commerce platform itself, but might instead be implemented as a standalone component or service external to the e-commerce platform. Moreover, the embodiments described herein are not necessarily even limited to an e-commerce platform or commerce, but may apply to any computer system in which the detection of fraudulent activity is desired. Therefore, the embodiments below will be described more generally.

Example System for Detecting Fraudulent Users

Figure 4:
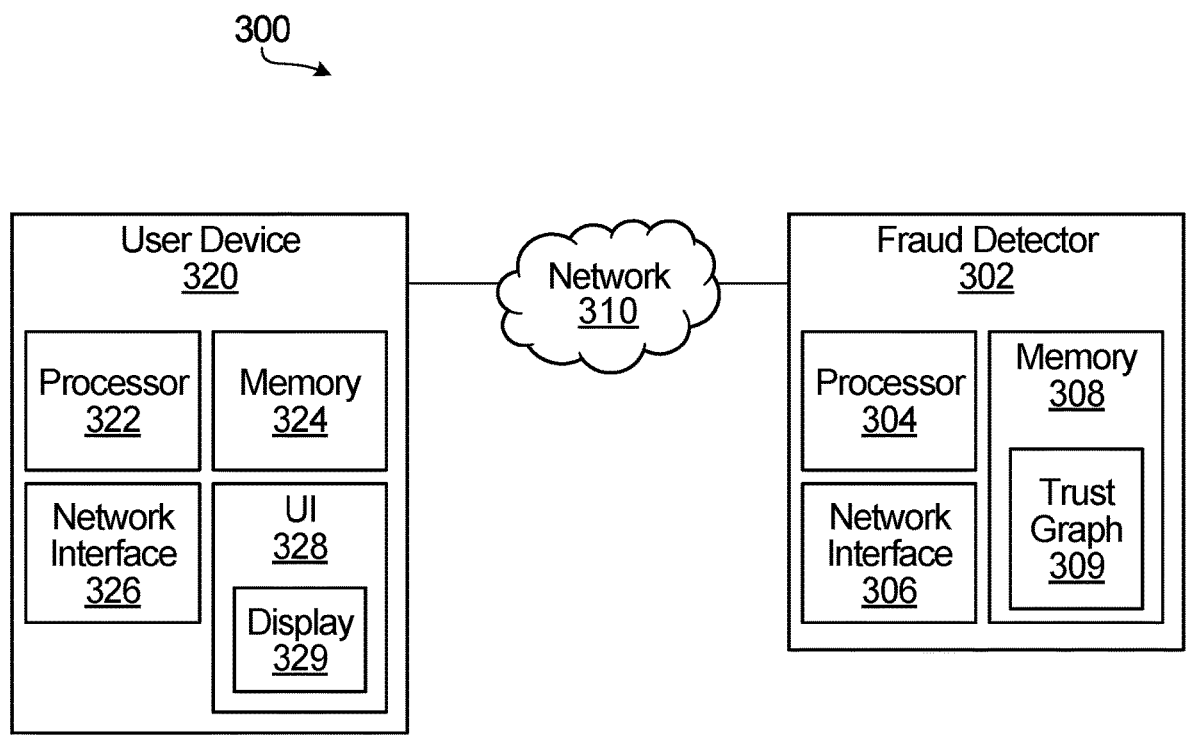
FIG. 4 illustrates a system for determining the untrustworthiness of a user associated with a user device, according to one embodiment.

FIG. 4 illustrates a system 300 for determining if a user interacting with a computer system is a fraudulent user, according to one embodiment. The system 300 includes a fraud detector 302 and at least one user device 320. Only a single user device 320 is illustrated.

The fraud detector 302 includes a processor 304 for implementing the operations described herein that are performed by the fraud detector 302, e.g. operations such as assigning a value associated with the untrustworthiness of the user and generating web content that provides friction to the user if the fraud detector 302 determines the user may be fraudulent. The processor 304 may be implemented by one or more general purpose processors that execute instructions stored in a memory (e.g. in memory 308) or stored in another non-transitory computer-readable medium. The instructions, when executed, cause the processor 304 to directly perform, or instruct the fraud detector 302 to perform, the operations of the fraud detector 302 described herein. In other embodiments, the processor 304 may be implemented using dedicated circuitry, such as a programmed FPGA, a GPU, or an ASIC.

The fraud detector 302 further includes a network interface 306. The network interface 306 is for communicating over a network 310, e.g. to communicate with user device 320 described below. The network interface 310 may be implemented as a network interface card (NIC), and/or a computer port (e.g. a physical outlet to which a plug or cable connects), and/or a network socket, etc., depending upon the implementation.

The fraud detector 302 further includes a memory 308. A single memory 308 is illustrated in FIG. 4, but in implementation the memory 308 may be distributed. The memory 308 stores a trust graph 309 that holds values associated with the untrustworthiness of the users and associated attributes that are known by the fraud detector 302.

In some embodiments, the fraud detector 302 may be implemented inside of an e-commerce platform. In some embodiments, the fraud detector 302 may be implemented within or external to a computer system, where the computer system is not necessarily an e-commerce platform. In some embodiments, some or all of the processor 304, memory 308, and/or network interface 306 may be located outside of the fraud detector 302.

User device 320 is a computing device used by a user interacting with fraud detector 302. For example, the user may be attempting to perform an electronic transaction in a computing system using user device 320. The user device 320 may be a smartphone, laptop, desktop computer, tablet, augmented reality (AR) device, etc., depending upon the implementation. The user device 320 includes a processor 322, a memory 324, a user interface 328, and a network interface 326. The processor 322 directly performs, or instructs the user device 320 to perform, the operations of the user device 320 described herein, e.g. providing information to the fraud detector 302, displaying the web content provided over the network 310, etc. The processor 322 may be implemented by one or more general purpose processors that execute instructions stored in a memory (e.g. memory 324) or stored in another non-transitory computer-readable medium. The instructions, when executed, cause the processor 322 to directly perform, or instruct the user device 320 to perform, the operations of the user device 320 described herein. In other embodiments, the processor 322 may be implemented using dedicated circuitry, such as a programmed FPGA, a GPU, or an ASIC.

The user interface 328 may be implemented as a display screen (which may be a touch screen), and/or a keyboard, and/or a mouse, and/or a speaker etc., depending upon the implementation. For example, a display 329 is illustrated. The network interface 326 is for communicating over a network, e.g. to communicate with the fraud detector 302 over network 310. The structure of the network interface 326 will depend on how the user device 320 interfaces with the network. For example, if the user device 320 is a mobile phone, laptop, or tablet, the network interface 326 may comprise a transmitter/receiver with an antenna to send and receive wireless transmissions to/from the network. If the user device 320 is a personal computer connected to the network with a network cable, the network interface 326 may comprise a network interface card (NIC), and/or a computer port (e.g. a physical outlet to which a plug or cable connects), and/or a network socket, etc.

In some embodiments, the user device 320 may belong to a customer attempting to make a purchase in an online store, such as customer device 150 in FIG. 3. In other embodiments, the user device 320 may belong to a merchant, such as merchant device 102 in FIG. 3, e.g. when a merchant may be attempting to collect payment from their online store. In other embodiments, the user device 320 may be a device used by any user interacting with a computer system. The computer system might or might not relate to e-commerce.

In some embodiments, the fraud detector 302 is part of an e-commerce platform, e.g. e-commerce platform 100. For example, the fraud detector 302 may be fraud detector 202 illustrated in FIG. 3. However, this is not necessary. The fraud detector 302 may instead be provided by another component of an e-commerce platform or implemented as a stand-alone component or service that is external to an e-commerce platform. In some embodiments, either or both of the applications 142A-B of FIG. 3 provide the fraud detector 302 in the form of a downloadable application that is available for installation, e.g. in relation to a merchant account. In other embodiments, the fraud detector 302 may be implemented on or in association with a computer system that is not an e-commerce platform. In some embodiments, some operations of the fraud detector 302 described herein could potentially be implemented, in part, on user device 320.

Although the embodiments are not limited to an e-commerce environment, for the sake of example the specific embodiments below will be described in the context of e-commerce. In the specific embodiments below, it will be assumed that user device 320 is a device (such as a customer device, merchant device, or partner device) that is interacting with a computer system that is an e-commerce platform. For example, the user device 320 is performing a transaction related to an online store. The fraud detector 302 either sits within the e-commerce platform or outside it, but in any case, has access to the information provided by the user device 320 to the e-commerce platform, and the fraud detector 302 uses a trust graph to try to determine, in real-time (or near real-time), whether the user is fraudulent. The fraud detector 302 also subsequently (e.g. later offline) updates the trust graph.

Determining Likelihood of Fraud Using the Trust Graph

In some embodiments, the fraud detector 302 may be used to determine whether a new user associated with user device 320 is a fraudulent user before the new user is able to perform a transaction in an online store. The fraud detector 302 may use the trust graph 309 stored in memory 308 to assign an untrustworthiness value associated with the new user based on stored user and attribute untrustworthiness values already in the trust graph 309. The resulting estimated user untrustworthiness value may be used to determine how the fraud detector 302 will interact with the user device 320. For example, if the new user is determined to likely be a fraudulent user, the fraud detector 302 will request for the new user to provide additional information through the user interface 328 of the user device 320. Otherwise, the fraud detector 302 will provide the new user with their requested web content through the user interface 328, such as providing the ability for the user to complete their desired transaction.

For example, a user associated with user device 320, Anne, may be attempting to make a purchase in an online store and may be new to the e-commerce platform, having never shopped online before on the e-commerce platform. The fraud detector 302 may determine the likelihood of Anne being a fraudulent user based on information Anne provides to the fraud detector 302 via Anne's user device 320. The fraud detector 302 uses the trust graph 309 in the manner explained below.

The trust graph 309 is built prior to new user Anne. The trust graph 309 includes both user nodes and attribute nodes. Each user is represented by a user node. There might be different user node types, e.g. "customer", "merchant", etc. Each attribute node represents an attribute. There might be different attribute node types, e.g. "email address", "IP address", etc. For example, the attribute "jane@example.com" is an attribute of the attribute type "email address". Attributes of a user are represented by attribute nodes that are connected to the user node of that user.

Figure 5:
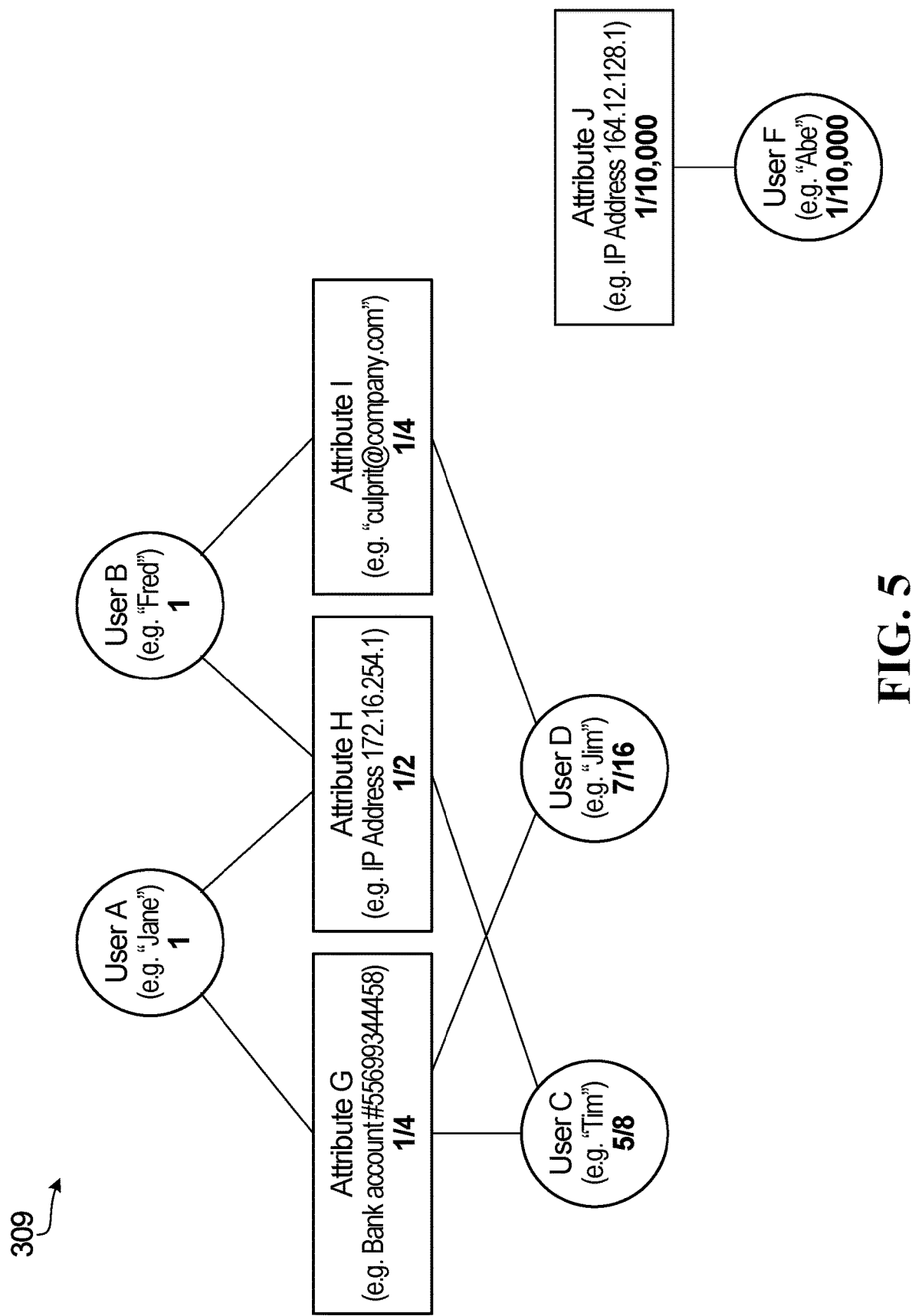
FIG. 5 illustrates a trust graph including users and attributes already known, according to one embodiment.

FIG. 5 illustrates trust graph 309 including users and attributes known to the fraud detector 302, according to one embodiment. Trust graph 309 stores a plurality of users, Users A, B, C, D, and F, and a plurality of attributes, Attributes G, H, I, and J, that have associated untrustworthiness values that have been previously determined from interaction of each of the users with the e-commerce platform. In trust graph 309, each user is represented by a user node in the form of a circle. Each user has one or more attributes, and each attribute is represented by an attribute node in the form of a box. The relationship between a user and an attribute is indicated by a line linking a user node and an attribute node, and an attribute may be associated with more than one user.

Each user node is assigned a probability that the user corresponding to that user node is a fraudulent user. The assigned probability is called a user untrustworthiness value. A fraudulent user is a user that is associated with fraudulent activity. Users A and B, i.e. Jane and Fred, have been previously determined by the fraud detector 302 to be fraudulent users and have thus been assigned an untrustworthiness value of 1. In trust graph 309, User A has two associated attributes, Attribute G (i.e., the bank account number #55699344458 provided by User A) and Attribute H (i.e., the IP address 172.16.254.1 of the user device used by User A). These attributes were determined from previous interaction of User A with the e-commerce platform. User B is also known to be associated with two attributes, Attribute H (i.e., the IP address 172.16.254.1 of the user device used by User B) and Attribute I (i.e., the e-mail address culprit@company.com provided by User B). In trust graph 309, both known fraudulent users, User A and User B, share the same attribute, Attribute H, which here is the same IP address.

Each attribute in the trust graph 309 is assigned an untrustworthiness value, which in this example is a probability value determined and updated (via a graph update) using a belief propagation algorithm. Intuitively, the untrustworthiness value of an attribute is a function of how connected that attribute is to user(s) having a high probability of being a fraudulent user.

Users C, D, and F are also each assigned an untrustworthiness value that is indicative of fraudulent activity. The user untrustworthiness value is a probability value representing the probability that the user is a fraudulent user. The probability values are determined using a belief propagation algorithm and are a function of how connected the user is to other users having a high probability of being a fraudulent user.

Trust graph 309 shows that User C, Tim, shares two attributes with the two known fraudulent users. Specifically, User C shares Attribute H with both User A and User B, and also shares Attribute G with User A. The belief propagation algorithm has previously determined that the probability that User C is a fraudulent user is 5/8.

User D, Jim, shares Attribute G with User A, and User D shares Attribute I with User B. The belief propagation algorithm has previously determined that the probability that User D is a fraudulent user is 7/16.

Conversely, User F, Abe, in trust graph 309 is only associated with Attribute J (i.e., the IP address 164.12.128.1 of the user device used by User F). User F does not share any attributes with any other users and therefore is not associated with any of the other user nodes in the trust graph 309. As the fraud detector 302 has determined that User F and Attribute J are not associated with fraudulent activity and are not linked to other nodes in the trust graph 309, they have each been assigned a small a priori untrustworthiness value of 1/10 000 assigned by default. The value of a default a priori untrustworthiness value may be a function of the attribute type. User F has an associated low probability of being a fraudulent user because it has no connection to a known fraudulent user.

In the figures, a user is assumed to be a person (e.g. "Jane"). In general, a user associated with a user node may be a known individual, a known corporation, or any other known entity with associated attributes. In other embodiments, a user might simply be a label for a collection of attributes associated with a particular entity.

Figure 6:
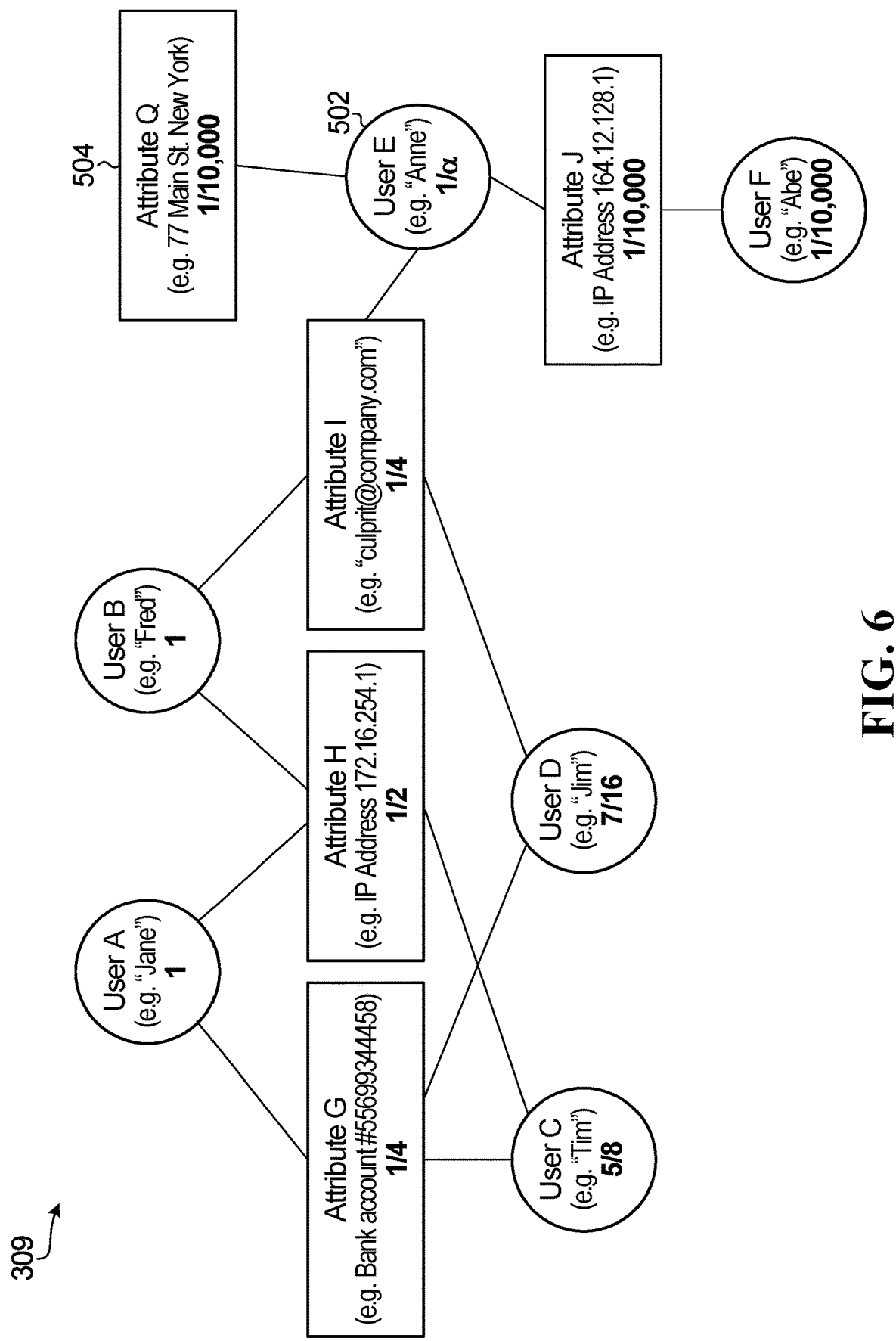
FIG. 6 illustrates the trust graph including the known users and attributes, as well as a new user and attribute, according to one embodiment.

FIG. 6 illustrates trust graph 309 of FIG. 5, but modified to include the addition of new User E 502, who is the new user Anne introduced earlier. New User E 502, Anne, has begun to interact with the e-commerce platform. New User E (who may also be referred to as "Anne" hereinafter), may be the user of user device 320 of FIG. 5 and may be a new customer creating a new customer profile to make a purchase from an online store on the e-commerce platform. Alternatively, new User E 502 may be a new merchant setting up an online store on the e-commerce platform. As User E 502 provides new information, i.e. attributes, it is determined whether any of the attributes are the same as attributes already present in trust graph 309. Here, User E 502 is associated with a new attribute, Attribute Q 504, which is the address provided by User E 502 "77 Main St. New York". As well, User E 502 shares the IP address of Attribute J with User F and the e-mail address of Attribute I with Users B and D. Therefore, in the interaction with the e-commerce platform thus far, User E 502 has provided a postal address that is new, but the email address provided by User E 502 is the same as that provided by Users B and D, and the IP address of user device 320 used by User E 502 is the same as the IP address that was previously used by the user device of User F.

Attribute Q 504 is new (i.e. not shared with another attribute already in the graph) and has therefore been initialized to have an a priori untrustworthiness value of 1/10 000. In some implementations, new attributes, such as Attribute Q 504, may be initialized to a generic untrustworthiness value based on the attribute type. In other implementations, new attributes might not be assigned a value and/or might not be considered when assigning an untrustworthiness value to a new user.

In real-time, or near real-time, as User E 502 is providing attributes to the e-commerce platform, the attributes are forwarded to the fraud detector 302, and the fraud detector 302 computes the probability of User E 502 being a fraudulent user based on the probability values already in the trust graph 309 prior to User E. The probability that User E 502 is a fraudulent user is referred to as User E's untrustworthiness value. In some embodiments, the probability is computed using the untrustworthiness value of each of one or more of the edges (attributes) directly connected to User E 502 and/or using the untrustworthiness value of each of one or more of the nodes adjacent to User E, where a node adjacent to User E is a user that shares an attribute with User E, i.e. is connected to User E by a single edge.

In the example, User E's untrustworthiness value is computed as $1/\alpha$. The placeholder value "$\alpha$" is used because the exact value is dependent upon the specific formula/ computation implemented, which is implementation specific. For completeness, the following formula may be implemented in some embodiments to determine the untrustworthiness value:

$$f(E) = \Sigma T[f(x) \cdot f(M)]; \ x \in EM, \ M \in \text{Adj}[E],$$

f(E) is the untrustworthiness value, i.e. the probability that the node 502 (User E) is fraudulent, which is determined to be 1/α in the example. T is a transform, i.e. a function, that is implementation specific and dependent upon the equation desired to be used to calculate the probability. In the formula, E represents the set of edges (attributes) that are connected to the node 502, which in the example are attributes Q, I, and J. The value x represents the probability value (untrustworthiness value) assigned to an edge (attribute), selected from the set of edges (attributes) connected to the node 502. M represents the set of nodes (users) neighbouring node 502, i.e. sharing an attribute with node 502. In the example, M is the set consisting of users F, B, and D. The value f(x) is a weighted version of probability x, but if no weighting is applied then f(x)=x. The value f(M) represents the probability of the adjacent node being a fraudulent user, possibly modified by a weighting, depending upon the implementation. In the example, because the attribute Q is not connected to another user (i.e. it is a "dangling edge"), the attribute Q may be ignored in the computation or incorporated in another way, e.g. by assuming it is connected to a "dummy" non-existent user having a predetermined a priori probability of being fraudulent. f(x)·f(M) is multiplication of f(x) by f(M), which may be a matrix multiplication, depending upon the implementation.

The example formula above is not specific to the working example presented, but applies more generally to embodiments utilizing a graph (e.g. trust graph) implementation. To determine the probability that a new node (user) in the graph is fraudulent, the formula above may be applied, where E represents the set of edges (attributes) that are connected to the new node and M represents the set of nodes (users) neighbouring the new node, i.e. sharing an attribute with the new node. Each of these edges and neighbour nodes have a respective untrustworthiness value (probability value) in the graph which is used to execute the formula.

In some implementations, if the probability that User E 502 is a fraudulent user exceeds a predetermined threshold (e.g. 1/α>threshold), then "friction" may be added to User E's interaction with the e-commerce platform. For example, User E 502 may be required to provide more attributes, which may be used by the fraud detector 302 to refine the probability that User E 502 is a fraudulent user. For example, if User E 502 is a merchant setting up a merchant account, User E 502 might be asked to provide the bank account number for a bank account to be used by User E 502 to receive deposits of money from buyers. User E might provide Attribute G (i.e. the same bank account number provided by User A), thereby further increasing the probability that User E 502 is fraudulent. Once a certain probability threshold is reached (e.g. 1 or above ¾, etc.), User E 502 may be determined to be a fraudulent user and denied service. In some embodiments, the friction may be in the form of a question that presumably only a non-fraudulent user should be able to answer, e.g. a two-factor authentication or a question that requires the user to sign into their online banking account, etc. In some embodiments, whether or not the user answers the question correctly might be an attribute, e.g. with the correct answer being associated with a low probability of untrustworthiness and incorrect answer being associated with a high probability of untrustworthiness.

Therefore, it will be appreciated that in some embodiments the web content provided to User E 502 is based on the untrustworthiness value computed for User E 502. For example, if User E 502 is requesting certain web content relating to completing a transaction, but the fraud detector 302 determines that the untrustworthiness value of User E 502 falls within a particular range (e.g. the probability that User E 502 is a fraudulent user is above a certain threshold), then the web content returned may instead be the friction described above. However, if the untrustworthiness value of User E 502 falls outside the particular range (e.g. the probability that User E 502 is a fraudulent user is below a certain threshold), then the web content returned may be that requested by User E 502.

Computing the probability that User E 502 is a fraudulent user has a relatively low computational cost because it uses probability values previously populated for user nodes and attribute nodes in trust graph 309. Computing the probability that User E 502 is a fraudulent user may therefore be performed in real-time or near real-time. Therefore, User E 502 may be identified as a fraudulent user in real-time or near real-time while User E interacts with the e-commerce platform, e.g. before User E 502 completes the transaction on the e-commerce platform.

Later, e.g. offline, trust graph updates (such as belief propagation) may be implemented by the fraud detector 302, e.g. using a belief propagation algorithm, in order to incorporate the impact of User E 502 and User E's attributes into the rest of the trust graph 309.

Figure 7:
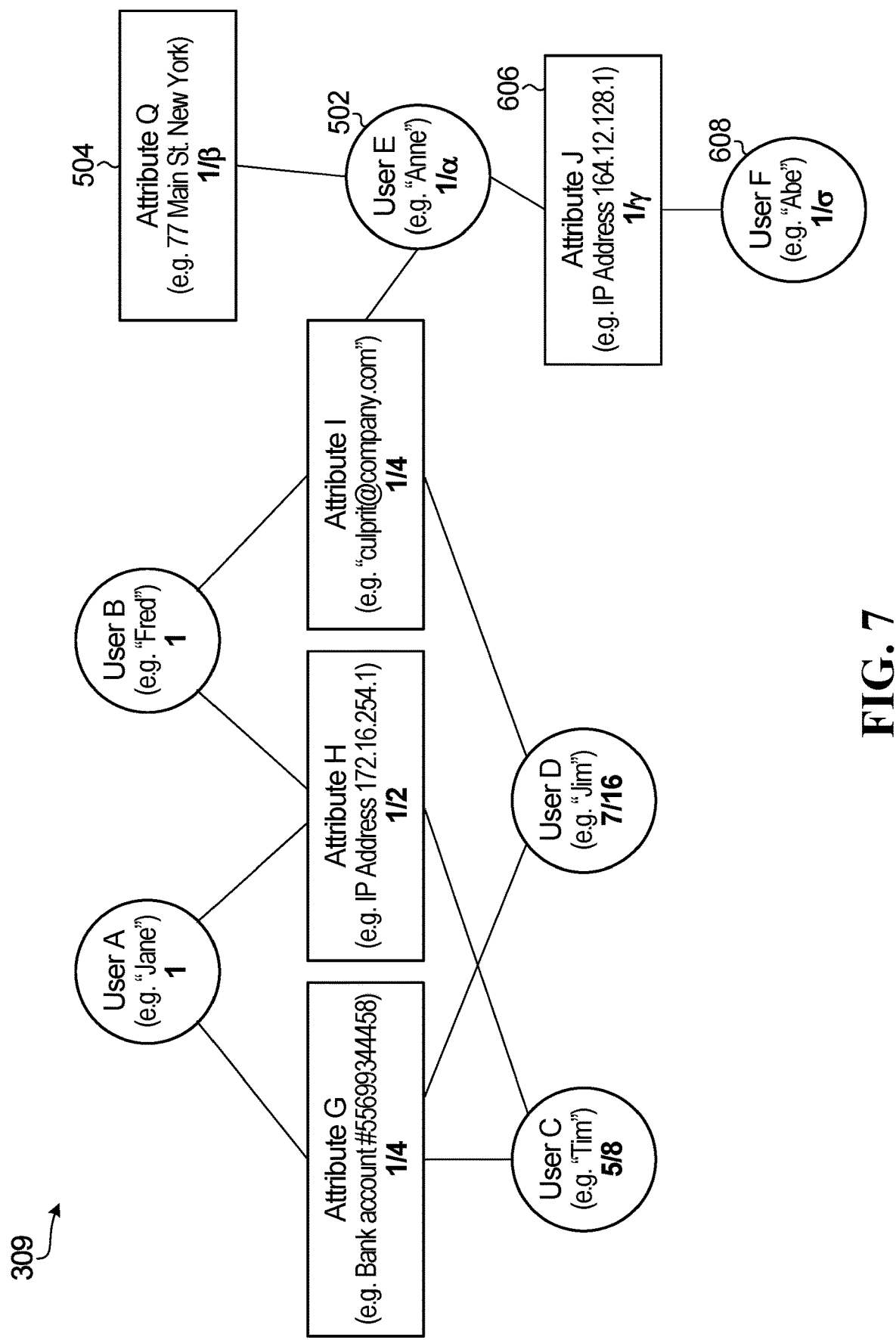
FIG. 7 illustrates an updated trust graph, according to one embodiment.

For example, FIG. 7 illustrates trust graph 309 updated following User E's 502 interaction with the e-commerce platform. The untrustworthiness values associated with Attribute Q 504, Attribute J 606, and known User F 608, are updated to reflect the new data obtained by the fraud detector 302. In some embodiments, the updating the untrustworthiness values is performed through belief propagation using a belief propagation algorithm, which incorporates the impact of User E 502 (e.g. the probability 1/α determined for User E) into the rest of the nodes of trust graph 309. In particular, the probability values associated with all connected nodes are modified by way of the belief propagation algorithm. For example, because User E 502 is assigned a probability of 1/α of being a fraudulent user, then the untrustworthiness probability value for Attribute J 606 is updated to 1/γ based on its association with User E. The placeholder value "γ" is used because the exact value is dependent upon the specific belief propagation implemented, and so is implementation specific. Manners of belief propagation are known in the art. Previously, Attribute J 606 was only associated with User F 608, which was not associated with any other attributes known to the trust graph 309. Therefore, Attribute J was assigned only the a priori untrustworthiness value of 1/10 000. Following the introduction of User E 502, which shares an attribute with known fraudulent User B, Attribute J 606 becomes linked to the other nodes in trust graph 309, impacting its believed untrustworthiness value. Similarly, Attribute Q 504 is updated to an untrustworthiness value of 1/β, and User F 608 is updated to an untrustworthiness value of 1/σ. Placeholder values "β" and "σ" are used because, as mentioned above, the exact value is dependent upon the specific belief propagation implemented, and so is implementation specific.

As the probability value of nodes update during belief propagation, nodes connected to those nodes need their probability values updated, and so on. The extent of belief propagation required may be significant, e.g. for a large trust graph having a lot of connections, such that the belief propagation may have a relatively high computational cost. However, the belief propagation can be performed later, e.g. offline, and is independent of the step of determining the probability that new User E 502 is a fraudulent user.

The example embodiment described above has at least the following technical benefit. When a new user begins to interact with the e-commerce platform and provides attributes, the probability that the user is a fraudulent user may be computed relatively easily in real-time or near real-time using the probability values in the existing trust graph 309. If the new user is suspicious (e.g. probability above a certain threshold), then the user can be required to provide more attributes to refine the probability that the user is fraudulent, all in real-time or near real-time as the new user interacts with the e-commerce platform. Later (e.g. offline), the fraud detector 302 can be updated to perform belief propagation in order to incorporate, into the graph, the impact of new User E 502 and User E's associated attributes. The belief propagation step might be computationally complex and a relatively slow process, but it can be performed offline. This is also advantageous over the slower approach of first performing belief propagation and then computing the probability that the user is a fraudulent user after the completion of the belief propagation.

In some embodiments, the offline belief propagation might only be performed in response to a trigger, e.g.: only once a day, or only after one thousand new users are added, or only when a new user has a probability of being a fraudulent user that is determined to be above a certain threshold, or only when the new users added result in connecting a particular number of attributes together (e.g. a new user with completely new attributes that does not connect into the trust graph might not count).

User Interfaces

Figure 8:
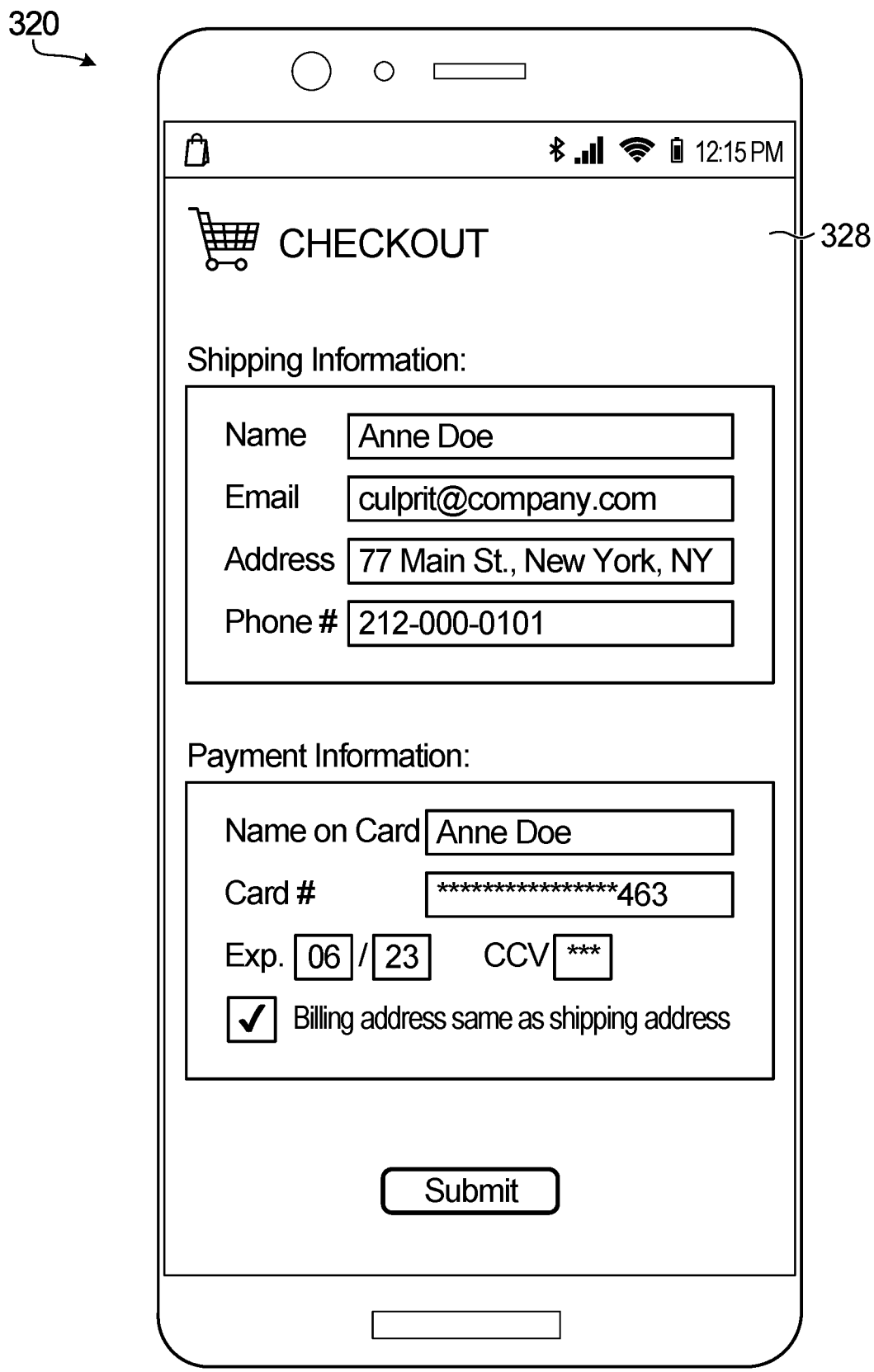
FIGS. 8 and 9 are example user interfaces of a user device on which the user is performing a transaction.

FIG. 8 illustrates user interface 328 of the user device 320 where the user is performing a transaction in an online store on an e-commerce platform, which will be assumed to be e-commerce platform 100. The user is assumed to be User E 502 ("Anne") introduced in the example earlier. In FIG. 8, Anne is attempting to make a purchase in an online store, and enters her shipping and payment information while checking out.

At the time that Anne is entering her information into user interface 328, Anne might not have previously made an online purchase and is assumed to be unknown to fraud detector 302 and e-commerce platform 100. The information she enters consists of attributes that the fraud detector 302 associates with her, such as her address "77 Main St. New York", which may later be stored as Attribute Q 504 in trust graph 309. While attempting to make a purchase from the online store, Anne and the information collected as her attributes may be stored in the trust graph 309, and a calculation may be performed in real time or near-real time to estimate an untrustworthiness value associated with a likelihood that Anne is a fraudulent user before her transaction is performed.

Figure 9:
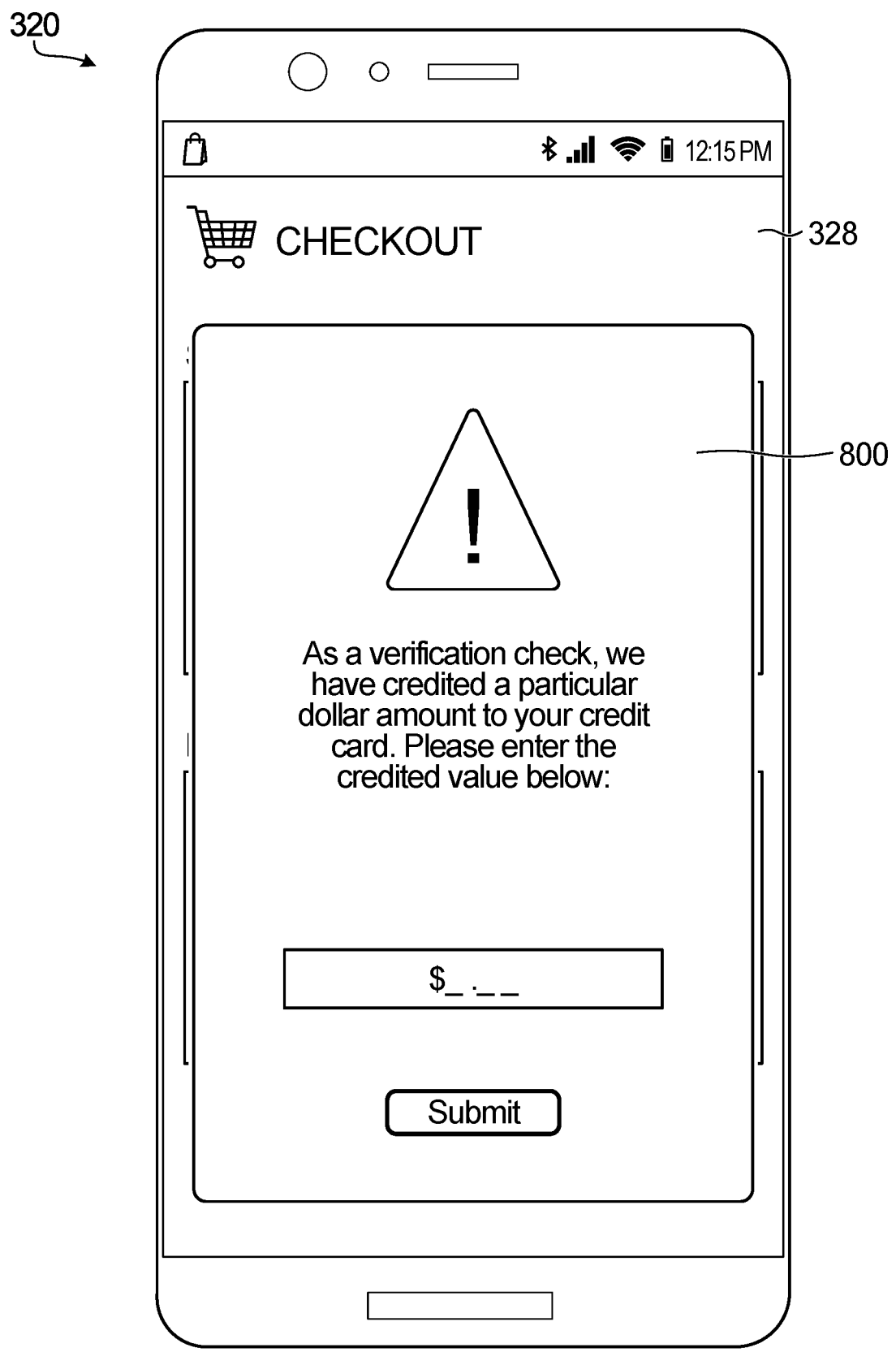

FIG. 9 illustrates the user interface 328 displaying web content in the form of a pop-up window 800 prompting the user to enter more information. The fraud detector 302 may have determined that an untrustworthiness value associated with user Anne exceeded a particular threshold. Pop-up window 800 is instructing the user to enter additional information as a way of providing friction. The information provided by user Anne in response to the request may be used by the fraud detector 302 as an additional attribute associated with the user to determine whether the user is likely to be a fraudulent user.

Pop-up window 800 indicates to the user that a particular dollar amount has been credited to the credit card matching the credit card number provided by the user in FIG. 8. The pop-up window 800 asks the user to provide the dollar amount in the pop-up window, verifying that the user is able to access banking information associated with the credit card and that the user is not, for example, making the purchase with a stolen credit card.

In one example, if the fraud detector 302 uses the untrustworthiness value of $1/\alpha$ or less as the threshold for applying friction, the fraud detector 302 will prevent Anne from completing a transaction without acquiring more attributes. Anne's believed untrustworthiness value may exceed the set threshold due to her sharing an e-mail address (e.g. culprit@company.com, Attribute I shown in FIGS. 5 to 7) with a known fraudulent user, User B. The fraud detector 302 determines that it is necessary to verify that Anne is able to access the banking information associated with the credit card number she provided to help verify that she is likely not also a fraudulent user. If Anne is able to enter the correct credited dollar amount to pop-up window 800, the fraud detector 320 may determine that Anne is not a fraudulent user and allow her to make her desired purchase. Here, "verified access to bank account" may be entered into trust graph 309 as an additional attribute with a very low untrustworthiness value. Alternatively, if Anne is unable to provide the correct credited dollar amount to pop-up window 800, the fraud detector 302 may cancel Anne's attempted transaction.

Example Methods

Figure 10:
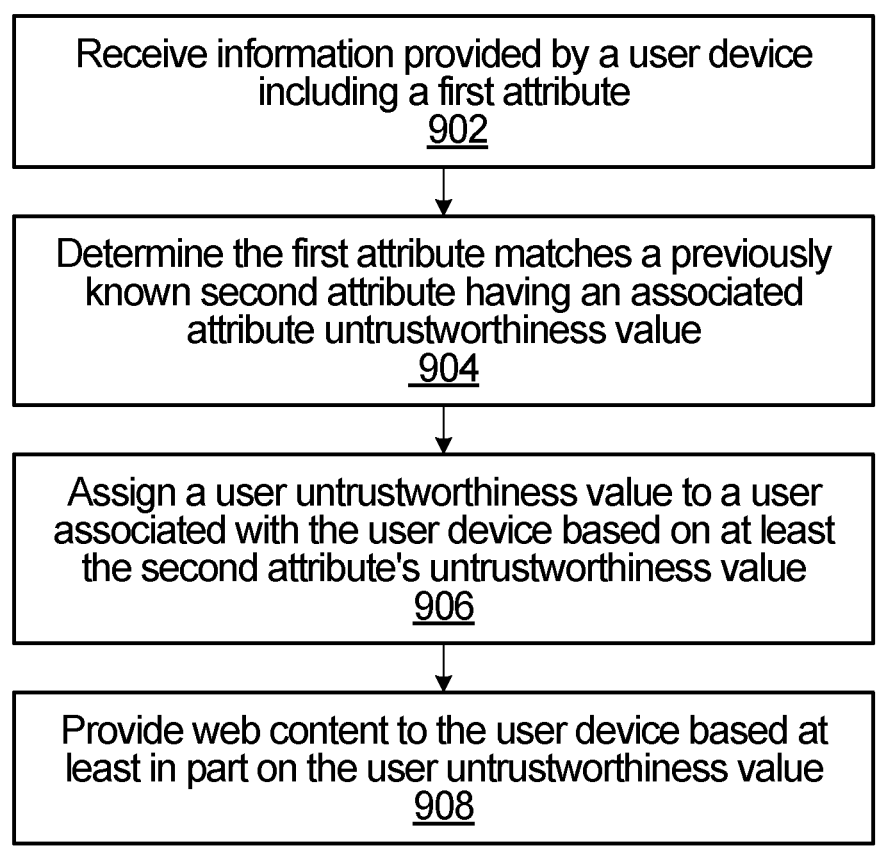
FIG. 10 is a computer-implemented method, according to one embodiment.

FIG. 10 is a computer-implemented method 900, according to one embodiment. Not all of the steps in the method 900 of FIG. 10 are necessary in all embodiments. Also, some of the steps may be substituted by other steps instead. In the explanation below, the user is assumed to be User E, Anne, introduced earlier. Anne uses user device 320 to interact with a computer system. The computer system may be an e-commerce platform, although not necessarily. For example, the computer system could be another system not related to e-commerce, e.g. a social media platform. In method 900, the steps are described as being performed by the processor 304 of fraud detector 302, but this is only an example. For example, the method 900 may instead be performed by another entity, which might or might not be part of the computer system.

At step 902 of method 900, the processor 304 receives information provided to the computer system by user device 302. The information includes a first attribute. The processor 304 of the fraud detector 302 obtains the information as follows in one embodiment: the information is provided by the user via the user interface 328 of the user device 320, the user device 320 transmits the information over network 310 to the computer system, and the computer system forwards the information to the fraud detector 302. In some embodiments, the information including the first attribute may be identifying information, such as an email address, financial information, such as a credit card number, browser details, an IP address, online store information, device information, or another type of attribute described herein. For example, User E, Anne, may attempt to perform a transaction in an online store and may enter her shipping and billing information on a checkout page, as shown in FIG. 8. Here, the fraud detector 302 receives the information input by Anne using her user device 320. The e-mail address she enters, "culprit@company.com", may be the first attribute.

At step 904 of method 900, the processor 304 determines that the first attribute matches a second attribute. The second attribute is known to the computer system prior to receiving the information from the user device 302, and the second attribute has an associated attribute untrustworthiness value that is indicative of a first level of untrustworthiness. For example, the second attribute may be information already stored as an attribute node in trust graph 309 stored in memory 308 of the fraud detector 302. For example, the first attribute may be the email address entered by Anne using user device 320, "culprit@company.com". The second attribute may be Attribute I stored in trust graph 309 of FIG. 6, which is also the e-mail address "culprit@company.com". Attribute I has an attribute untrustworthiness value of 1/4 based on its association with User D and known fraudulent User B. The fraud detector 302 may determine that Attribute I stored in trust graph 309 matches the e-mail address provided by Anne.

At step 906 of method 900, the processor 304 assigns, to a user associated with the user device 302, a user untrustworthiness value that is indicative of a second level of untrustworthiness. The user untrustworthiness value is based at least on the attribute untrustworthiness value associated with the second attribute. For example, the fraud detector 302 may assign an untrustworthiness value to Anne to indicate the likelihood that she is a fraudulent user. Trust graph 309 of FIG. 6 shows that User E, Anne, 502 is assigned a user untrustworthiness value of $1/\alpha$. Anne's assigned user untrustworthiness value is based on the collection of attributes associated with her and their respective attribute untrustworthiness values. Anne's assigned user untrustworthiness value is determined in part by the attribute untrustworthiness value of Attribute I, i.e. 1/4.

At step 908 of method 900, the processor 304 generates web content that is provided to the user device 320. The web content is based, at least in part, on the user untrustworthiness value. The web content may be provided to the user device 320 via the computer system, e.g. if the user device 320 is interacting directly with the computer system and the fraud detector 302 operates in the background. The web content is provided for presentation at the user interface 328 of user device 320. The web content may be a new web resource, such as a new web page or function (e.g. an add-to-cart or checkout-related function). For example, the web content may be a checkout page or a new web page confirming that the user's transaction was successful. Alternatively, the web content may include hiding or showing an aspect of the current web page. One example may be that, upon entering shipping and billing information into a checkout page when attempting to make a purchase from an online store, a CAPTCHA™ section may appear at the bottom of the form. The CAPTCHA™ may be web content that appears on the current web page as the next step towards completing a transaction, such as a purchase. In a further example, the web content may contain "friction" to obtain an additional attribute from the user, e.g. the web content may be pop-up window 800 of FIG. 9.

Untrustworthiness values are primarily discussed herein. In an alternative embodiment, the attributes stored in the trust graph 309 may instead be assigned trustworthiness values. A trustworthiness value may indicate the likelihood that an attribute is associated with a user who is not fraudulent. These trustworthiness values may be determined as "1—an untrustworthiness value". Likewise, user trustworthiness values may be assigned instead of user untrustworthiness values, which indicate the likelihood that a user is not a fraudulent user. More generally, a trustworthiness value is equally an untrustworthiness value, and vice versa. Using one term is interchangeable with the other. It is just a matter of semantics. A value assigned to a user or attribute that is indicative of a level of untrustworthiness is inherently also indicative of a level of trustworthiness. In some embodiments, a value indicative of a level of untrustworthiness (or trustworthiness) is a value indicative of fraudulent activity.

In some implementations, the computer system may be e-commerce platform 100. The processor 304 of the fraud detector 302 may be a processor implemented as part of the commerce management engine 136. The user device 320 may be merchant device 102 or customer device 150. The second attribute and its attribute untrustworthiness value may be known to the e-commerce platform 100 and stored within memory 204, or in a memory implemented as part of fraud detector 202 or commerce management engine 136.

In some embodiments, if the user untrustworthiness value determined in step 906 falls within a particular range (e.g. above a particular threshold), the web content provided in step 910 includes a request prompting the user to provide additional information. The web content provided may include a request originating from the fraud detector 302, asking for additional information from the user of user device 320.

In an example, a particular range may be defined for fraud detector 302 such that user untrustworthiness values at or exceeding $1/\alpha$ may prompt the fraud detector 302 to request additional information from a user. For example, in the example explained earlier in relation to FIG. 6, the fraud detector 302 has assigned Anne a user untrustworthiness value of $1/\alpha$, shown by user node 502 of trust graph 309. Consequently, the fraud detector 302 may provide Anne with pop-up window 800 of FIG. 9, which requests additional information from Anne in order to provide the fraud detector 302 further information to use to determine whether Anne may be a fraudulent user. In this example, pop-up window 800 indicates that the fraud detector 302 has credited a dollar amount to the credit card associated with the credit card number Anne provided, and requests that she enters the specific dollar amount into the pop-up window.

In some embodiments, when method 900 includes prompting the user to provide additional information when the user untrustworthiness value falls within a particular range, the method may further include receiving an additional attribute in response to the prompting the user for the additional information. Then, the processor 304 redetermines the user untrustworthiness value based at least on the attribute untrustworthiness value associated with the second attribute and another attribute untrustworthiness value that is associated with the additional attribute. The fraud detector 302 may use the additional information input into the user interface 328 of the user device 320 as the additional attribute. The additional attribute may be assigned a new untrustworthiness value, which may be used in the recalculation of the user untrustworthiness value.

For instance, Anne may use her user device 320 to enter in the dollar amount credited to her account noted in pop-up window 800 of FIG. 9. If Anne is able to access the banking information associated with the credit card and provide the correct dollar amount to fraud detector 302, an attribute such as "verified access to banking information", having a low untrustworthiness value, may be associated with Anne in trust graph 309. Then, using the additional attribute "verified access to banking information" and the existing attributes associated with Anne, a new, lower, user untrustworthiness value may be assigned to Anne.

In some embodiments, if the user untrustworthiness value falls outside of the particular range, the web content is the web content requested by the user. The web content provided in step 908 of method 900 may be the requested content by the user of user device 320. Falling outside a particular range may include falling below a particular threshold.

For example, the particular range determined by fraud detector 302 may be a user untrustworthiness value exceeding 3/4. Assuming Anne's assigned user untrustworthiness value of 1/α, shown within user node 502 of trust graph 309, falls outside of this particular range, the fraud detector 302 determines her unlikely to be a fraudulent user. As a result, the fraud detector 302 enables Anne to complete her requested transaction, and she may be provided with web content indicating that her attempt to check out in the online store was successful.

In some embodiments, subsequent to transmitting the web content to the user device 320, method 900 may further include: in response to an occurrence of a predefined event, updating at least attribute untrustworthiness values associated with one or more attributes that were known to the computer system prior to receiving the information from the user device. User untrustworthiness values may be updated also. The updating may be based on at least the user untrustworthiness value assigned to the user associated with the user device 320. Following a predefined event, which may occur after the user of user device 320 has completed their interaction with the computer system, the attribute untrustworthiness values of attributes previously stored in trust graph 309 (and possibly user untrustworthiness values) may be updated according to the belief propagation algorithm. The user untrustworthiness value assigned during step 906 of method 900 will be propagated throughout the existing nodes of trust graph 309 to assign new attribute and/or user untrustworthiness values as necessary.

For example, a predefined event may occur after Anne has finished her web session interacting with fraud detector 302, or the predefined event could itself be the completion of the web session. Anne's user node 502 in trust graph 309 of FIG. 7 is associated with Attribute J 606, which previously was only associated with User F, Abe, 608. As Anne has a user untrustworthiness value of 1/α, this is propagated to Attribute J 606 (via belief propagation) and subsequently User F 608, which are respectively re-assigned new attribute and user untrustworthiness values.

In some embodiments, the predefined event is at least one of: a particular amount of time since a previous update of the attribute and/or user untrustworthiness values, a particular number of new users providing information to the computer system, a particular number of shared attributes between new users and attributes previously known to the computer system, or a new user being assigned a user untrustworthiness value that falls within a particular range. The predefined event may be determined by the fraud detector 302 and may include any of the event types described herein. In some embodiments, the trust graph 309 may be updated via belief propagation after a new user has interacted with the fraud detector 302, when the new user shares attributes with a known user. For instance, trust graph 309 may be updated, as shown in FIG. 7, after User E 602, Anne, interacts with the computer system. This may be because Anne shares Attribute I with Users B and D, which are already stored within the trust graph 309.

In some embodiments, the assigning the user untrustworthiness value is performed while the user device 320 is interacting with the computer system. The updating at least the attribute untrustworthiness values in response to the occurrence of the predefined event is performed after the user device has interacted with the computer system (e.g. after the user ends a session, such as a web session, with the computer system). The fraud detector 302 may determine the user untrustworthiness value associated with a user of user device 320 while the user is attempting to complete a transaction, e.g. in real time or near-real time. Conversely, the attribute untrustworthiness values may be updated following the completion of the user device's 320 session interacting with the computer system.

For example, User E 502, Anne, may be assigned a user untrustworthiness value of 1/α in real time while she is attempting to make a purchase from an online store. The trust graph 309 creates a user node with the assigned user untrustworthiness value, as shown at 502 in FIG. 6. However, the attribute untrustworthiness value of Attribute J is not updated until Anne's interaction with the computer system is complete. Once Anne has ended her web session, and a predefined event, such as one of the predefined events described herein, has occurred, the attribute untrustworthiness value of Attribute J 606 is updated via belief propagation as shown in FIG. 7.

In some embodiments, the first attribute is an item of information provided before completing a transaction. In some embodiments, the item of information is for use by the computer system to communicate with the user. For example, in FIG. 8 the user of user device 320, Anne, is attempting to make a purchase in an online store and enters shipping and billing information into interface 700. She enters the address "77 Main St. New York", which is determined to be an attribute associated with Anne by fraud detector 302. This address is stored in trust graph 309 of FIG. 6 as Attribute Q 504 associated with User E 502, Anne.

In some embodiments, the first attribute is one of the following associated with the user: a user name, an e-mail address, a phone number, an IP address, a postal address, a domain, financial information, an indication of a product previously purchased by the user, an indication of an online store the user previously purchased from, or browser details. The fraud detector 302 may determine any of the information described herein to be an attribute associated with a user and stored in trust graph 309 in memory 308. For example, trust graph 309 includes a bank account number as Attribute G, an IP address as Attributes H and J, an e-mail address as Attribute I, and a postal address as Attribute Q. An example of an attribute may also be a subset of an email address, such as email addresses associated with a particular domain. A product previously purchased by the user may also be an attribute, as particular products may be targeted for fraud more frequently, such as the purchase of gift cards. An online store the user previously purchased from or visited may be an attribute, e.g. it may be indicative of a fraud ring, where, for example, the merchant and buyer (and/or partner) may share an IP address. Information related to a browser may be an attribute. For example, browser details may reveal that a merchant and buyer are the same individual, or that a merchant and/or buyer are known fraudulent users. Financial information that may be an attribute and may include a bank account number, a PayPal™ account, a gift card, a series of gift cards, etc.

In some embodiments, method 900 provides storing a graph in memory, e.g. the trust graph 309, and the graph includes: user nodes, where each user node corresponds to a respective different user with a respective user untrustworthiness value, and attribute nodes, where each attribute node corresponds to a respective different attribute with a respective attribute untrustworthiness value. Each user node is connected to each attribute node associated with an attribute of that user, and different users sharing a same attribute are both connected to the attribute node associated with the same attribute. As an example, trust graph 309 in FIGS. 5 to 7 includes user nodes, such as nodes for Users A to F, and attribute nodes, such as nodes representing Attributes G to J and Q. Each user node of trust graph 309 has an associated user untrustworthiness value, e.g. User D has a user untrustworthiness value of 7/16. Likewise, each attribute node of trust graph 309 has an associated attribute untrustworthiness value, e.g. Attribute I has an attribute untrustworthiness value of 1/4. As User D is associated with Attribute G and Attribute I, the node representing User D is linked to the nodes representing Attribute G and Attribute I. Users A and C also share Attribute G, so the nodes representing User A and User C are also linked to the node representing Attribute G.

In some embodiments, where a graph is stored in memory with user nodes and attribute nodes, each user untrustworthiness value and each attribute untrustworthiness value is a probability value. In such embodiments, the method 900 may further include updating each probability value associated with one or more of the attribute nodes and/or one or more of the user nodes. In some embodiments, the updating may be performed via belief propagation according to a belief propagation algorithm, and the updating may be based on at least the probability value assigned to the user node associated with the user device 320. For example, trust graph 309 in memory 308 of the fraud detector 302 may assign user and attribute untrustworthiness values as probability values, as illustrated in FIGS. 5 to 7. The probability values stored in the trust graph 309 may be updated following a predetermined event, e.g. as new users, such as the user of user device 320, interact with and provide new information to the fraud detector 302. In some embodiments, updating may be based on at least the probability value assigned to the user node, although the probability value might actually change during the updating, e.g. as part of the belief propagation. The updating may also be based on the user node's connections to one or more attribute nodes in the trust graph.

For example, FIG. 6 provides trust graph 309 prior to updating and FIG. 7 provides the same trust graph after it has been updated following a predetermined event. In FIG. 6, Attribute J has an attribute untrustworthiness value of 1/10 000, indicating that there is only a 1/10 000 probability that Attribute J is associated with fraudulent activity. At this point, User E 502, Anne, has interacted with the fraud detector 302 and is stored as user node in trust graph 309, but her associated probability of being a fraudulent user has not been propagated through the existing nodes in the trust graph 309. Following belief propagation, Attribute J 606 has an increased probability value of $1/\gamma$. The fraud detector 302 has determined that due to Attribute J's 606 association with User E 602, it is more likely to be associated with fraudulent activity than previously believed.

In some embodiments, a system is provided for performing the methods described above. The system may include a memory (e.g. memory 308) to store information such as the trust graph 309. The system may further include at least one processor (e.g. processor 304) to perform operations such as determining the first attribute matches the second attribute, assigning a user untrustworthiness value, and generating web content. The system may further include a network interface (e.g. network interface 306) for transmitting the web content. In some embodiments, a computer-readable medium is provided having stored thereon computer-executable instructions that, when executed by a computer, cause the at least one computer to perform method steps described above.

Conclusion

Note that the expression "at least one of A or B", as used herein, is interchangeable with the expression "A and/or B". It refers to a list in which you may select A or B or both A and B. Similarly, "at least one of A, B, or C", as used herein, is interchangeable with "A and/or B and/or C" or "A, B, and/or C". It refers to a list in which you may select: A or B or C, or both A and B, or both A and C, or both B and C, or all of A, B and C. The same principle applies for longer lists having a same format.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Memory, as used herein, may refer to memory that is persistent (e.g. read-only-memory (ROM) or a disk), or memory that is volatile (e.g. random access memory (RAM)).

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

The invention claimed is:

1. A computer-implemented method comprising:
a computer system interacting in real-time with a user-device, including the computer system receiving a web resource request from the user device and the computer system receiving information from the user device, the information including a first attribute comprising at least one of: an email address; an IP address associated with the user device; or billing information;
a computer receiving the information provided to the computer system by the user device, the information including the first attribute;
the computer accessing from memory in real-time at least a portion of a graph, wherein the graph includes: (1) user nodes, wherein each user node corresponds to a respective different user, and (2) attribute nodes, wherein each attribute node corresponds to a respective different attribute; wherein each user node is connected to each attribute node with an attribute of that user, and different users sharing a same attribute are both connected to the attribute node associated with the same attribute;
the computer determining in real-time, based on the attribute nodes of the graph, that the first attribute received from the user device matches a second attribute stored in a particular attribute node of the graph, the second attribute stored in the particular attribute node in the graph being known to the computer system prior to receiving the information from the user device, and the particular attribute node having an associated attribute untrustworthiness value that is indicative of a first level of untrustworthiness;
the computer modifying the graph in the memory in real-time to add a new user node for a user associated with the user device, including connecting the new user node to both the particular attribute node and to at least one other attribute node corresponding to at least one other attribute present in the information received from the user device;
the computer assigning, to the new user node of the graph in real-time, a user untrustworthiness value that is indicative of a second level of untrustworthiness, the user untrustworthiness value based at least on the attribute untrustworthiness value associated with the particular attribute node, and the user untrustworthiness value representative of a probability that the user device is interacting with the computer system to perform fraudulent activity via the computer system;
the computer determining, using the user untrustworthiness value representative of the probability, that the user device may be interacting with the computer system to perform the fraudulent activity; and
responsive to the computer determining that the user device may be interacting with the computer system to perform the fraudulent activity:
the computer generating, in real-time, web content different from the web resource requested by the user device, and the computer providing, to the user device via the computer system, the web content instead of the web resource requested by the user device, wherein the user device is unable to access the web resource prior to providing input requested by the web content, and wherein the web content is based, at least in part, on the user untrustworthiness value;
the computer receiving the input requested by the web content, wherein the input originates from the user device;
based on the input requested by the web content and received by the computer, the computer recalculating, in real-time, the user untrustworthiness value assigned to the new user node of the graph to result in an updated user untrustworthiness value;
based on the updated user untrustworthiness value, the computer causing the computer system to provide the web resource to the user device, and the computer system providing, to the user device, the web resource.

2. The computer-implemented method of claim 1, wherein the web content includes a request prompting the user to provide additional information, and wherein the input includes the additional information.

3. The computer-implemented method of claim 2, further comprising: receiving an additional attribute as part of the input, and modifying the graph to connect the new user node to an additional attribute node corresponding to the additional attribute; and wherein the updated user untrustworthiness value is based at least on the attribute untrustworthiness value associated with the particular attribute node and another attribute untrustworthiness value that is associated with the additional attribute node.

4. The computer-implemented method of claim 1, wherein subsequent to providing the web resource to the user device, the method further comprises:
in response to an occurrence of a predefined event, updating at least attribute untrustworthiness values associated with one or more attributes that were known to the computer system prior to receiving the information from the user device, wherein the updating is based on at least the user untrustworthiness value assigned to the user associated with the user device.

5. The computer-implemented method of claim 4, wherein the predefined event is at least one of: a particular amount of time since a previous update of the attribute untrustworthiness values, a particular number of new users providing information to the computer system, a particular number of shared attributes between new users and attributes previously known to the computer system, or a new user being assigned a user untrustworthiness value that falls within a particular range.

6. The computer-implemented method of claim 4, wherein the assigning the user untrustworthiness value is performed while the user device is interacting with the computer system, and wherein the updating at least the attribute untrustworthiness values in response to the occurrence of the predefined event is performed after the user device has interacted with the computer system.

7. The computer-implemented method of claim 1, wherein the first attribute is an item of information provided before completing a transaction, and the item of information is for use by the computer system to communicate with the user.

8. The computer-implemented method of claim 1, wherein the first attribute further comprises one of the following associated with the user: a user name, a phone number, a postal address, a domain, financial information, an indication of a product previously purchased by the user, an indication of an online store the user previously purchased from, or browser details.

9. The computer-implemented method of claim 1, wherein each user node corresponds to a respective user untrustworthiness value; and wherein each attribute node corresponds to a respective attribute untrustworthiness value.

10. The computer-implemented method of claim 9, wherein each user untrustworthiness value and each attribute untrustworthiness value is a probability value, and wherein the method further comprises:
updating each probability value associated with one or more of the attribute nodes and/or one or more of the user nodes, the updating performed via belief propagation according to a belief propagation algorithm, wherein the updating is based on at least the probability value assigned to the user node associated with the user device.

11. A system comprising:
a computer system to: interact in real-time with a user-device, and receive a web resource request from the user device, and receive information from the user device, the information including a first attribute comprising at least one of: an email address; an IP address associated with the user device; or billing information;
a computer having at least one processor to:
receive the information provided to the computer system by the user device, the information including the first attribute;
access from memory in real-time at least a portion of a graph, wherein the graph includes: (1) user nodes, wherein each user node corresponds to a respective different user, and (2) attribute nodes, wherein each attribute node corresponds to a respective different attribute; wherein each user node is connected to each attribute node associated with an attribute of that user, and different users sharing a same attribute are both connected to the attribute node associated with the same attribute;
determine in real-time, based on the attribute nodes of the graph, that the first attribute received from the user device matches a second attribute stored in a particular attribute node of the graph, the second attribute stored in the particular attribute node in the graph being known to the computer system prior to receiving the information from the user device, and the particular attribute node having an associated attribute untrustworthiness value that is indicative of a first level of untrustworthiness;
modify the graph in the memory in real-time to add a new user node for a user associated with the user device, including connecting the new user node to both the particular attribute node and to at least one other attribute node corresponding to at least one other attribute present in the information received from the user device;
assign, to the new user node of the graph in real-time, a user untrustworthiness value that is indicative of a second level of untrustworthiness, the user untrustworthiness value based at least on the attribute untrustworthiness value associated with the particular attribute node, and the user untrustworthiness value representative of a probability that the user device is interacting with the computer system to perform fraudulent activity via the computer system;
determine, using the user untrustworthiness value representative of the probability, that the user device may be interacting with the computer system to perform the fraudulent activity; and
responsive to the computer determining that the user device may be interacting with the computer system to perform the fraudulent activity:
generate, in real-time, web content different from the web resource requested by the user device, and provide, to the user device via the computer system, the web content instead of the web resource requested by the user device, wherein the user device is unable to access the web resource prior to providing input requested by the web content, and wherein the web content is based, at least in part, on the user untrustworthiness value;
receive the input requested by the web content, wherein the input originates from the user device;
based on the input requested by the web content and received by the computer, recalculate, in real-time, the user untrustworthiness value assigned to the new user node of the graph to result in an updated user untrustworthiness value; and
based on the updated user untrustworthiness value, cause the computer system to provide the web resource to the user device; and
a network interface to transmit the web resource to the user device.

12. The system of claim 11, wherein the web content includes a request prompting the user to provide additional information, and wherein the input includes the additional information.

13. The system of claim 12, wherein the at least one processor is further to: receive an additional attribute as part of the input, and modify the graph to connect the new user node to an additional attribute node corresponding to the additional attribute; and wherein the updated user untrustworthiness value based at least on the attribute untrustworthiness value associated with the particular attribute node and another attribute untrustworthiness value that is associated with the additional attribute.

14. The system of claim 11, wherein subsequent to providing the web resource to the user device, the at least one processor is further to:
in response to an occurrence of a predefined event, update at least attribute untrustworthiness values associated with one or more attributes that were known to the computer system prior to receiving the information from the user device, wherein the updating is based on at least the user untrustworthiness value assigned to the user associated with the user device.

15. The system of claim 14, wherein the predefined event is at least one of: a particular amount of time since a previous update of the attribute untrustworthiness values, a particular number of new users providing information to the computer system, a particular number of shared attributes between new users and attributes previously known to the computer system, or a new user being assigned a user untrustworthiness value within a particular range.

16. The system of claim 14, wherein the at least one processor is to assign the user untrustworthiness value while the user device is interacting with the computer system, and wherein the at least one processor is to update at least the attribute untrustworthiness values in response to the occurrence of the predefined event after the user device has interacted with the computer system.

17. The system of claim 11, wherein the first attribute is an item of information provided before completing a transaction, and the item of information is for use by the computer system to communicate with the user.

18. The system of claim 11, wherein the first attribute further comprises one of the following associated with the user: a user name, a phone number, a postal address, a domain, financial information, an indication of a product previously purchased by the user, an indication of an online store the user previously purchased from, or browser details.

19. The system of claim 11, wherein each user node corresponds to a respective user untrustworthiness value; and wherein each attribute node corresponds to a respective attribute untrustworthiness value.

20. The system of claim 19, wherein each user untrustworthiness value and each attribute untrustworthiness value is a probability value, and wherein the at least one processor is further to:
update each probability value associated with one or more of the attribute nodes and/or one or more of the user nodes, the updating performed via belief propagation according to a belief propagation algorithm, wherein the updating is based on at least the probability value assigned to the user node associated with the user device.

21. A non-transitory computer-readable medium having stored thereon computer-executable instructions that, when executed by a computer, cause the computer to perform operations comprising:
receiving information provided to a computer system by a user device, wherein the computer system interacts in real-time with a user-device, including the computer system receiving a web resource request from the user device and the computer system receiving the information from the user device, the information including a first attribute comprising at least one of: an email address; an IP address associated with the user device; or billing information;
accessing from memory in real-time at least a portion of a graph, wherein the graph includes: (1) user nodes, wherein each user node corresponds to a respective different user, and (2) attribute nodes, wherein each attribute node corresponds to a respective different attribute; wherein each user node is connected to each attribute node associated with an attribute of that user, and different users sharing a same attribute are both connected to the attribute node associated with the same attribute;
determining in real-time, based on the attribute nodes of the graph, that the first attribute received from the user device matches a second attribute stored in a particular node of the graph, the second attribute stored in the particular attribute node in the graph being known to the computer system prior to receiving the information from the user device, and the particular attribute node having an associated attribute untrustworthiness value that is indicative of a first level of untrustworthiness;
modifying the graph in the memory in real-time to add a new user node for a user associated with the user device, including connecting the new user node to both the particular attribute node and to at least one other attribute node corresponding to at least one other attribute present in the information received from the user device;
assigning, to the new user node of the graph in real-time, a user untrustworthiness value that is indicative of a second level of untrustworthiness, the user untrustworthiness value based at least on the attribute untrustworthiness value associated with the particular attribute node, and the user untrustworthiness value representative of a probability that the user device is interacting with the computer system to perform fraudulent activity via the computer system;
determining, using the user untrustworthiness value representative of the probability, that the user device may be interacting with the computer system to perform the fraudulent activity; and
responsive to determining that the user device may be interacting with the computer system to perform the fraudulent activity:
generating, in real-time, web content different from the web resource requested by the user device, and providing, to the user device via the computer system, the web content instead of the web resource requested by the user device, wherein the user device is unable to access the web resource prior to providing input requested by the web content, and wherein the web content is based, at least in part, on the user untrustworthiness value;
receiving the input requested by the web content, wherein the input originates from the user device;
based on the input requested by the web content and received by the computer, recalculating, in real-time, the user untrustworthiness value assigned to the new user node of the graph to result in an updated user untrustworthiness value; and
based on the updated user untrustworthiness value, causing the computer system to provide the web resource to the user device.

22. The non-transitory computer-readable medium of claim 21, wherein the instructions, when executed, further cause the computer to perform operations comprising:
subsequent to providing the web resource to the user device: in response to an occurrence of a predefined event, updating at least attribute untrustworthiness values associated with one or more attributes that were known to the computer system prior to receiving the information from the user device, wherein the updating is based on at least the user untrustworthiness value assigned to the user associated with the user device.

23. The non-transitory computer-readable medium of claim 22, wherein the predefined event is at least one of: a particular amount of time since a previous update of the attribute untrustworthiness values, a particular number of new users providing information to the computer system, a particular number of shared attributes between new users and attributes previously known to the computer system, or a new user being assigned a user untrustworthiness value that falls within a particular range.

* * * * *